（12）United States Patent
Neo

(10) Patent No.: US 8,792,315 B2
(45) Date of Patent: Jul. 29, 2014

(54) INFORMATION RECORDING/REPRODUCING DEVICE AND METHOD

(71) Applicants:Hitachi Consumer Electronics Co., Ltd., Tokyo (JP); Hitachi-LG Data Storage, Inc., Tokyo (JP)

(72) Inventor: Atsushi Neo, Chigasaki (JP)

(73) Assignees: Hitachi Consumer Electronics Co., Ltd., Tokyo (JP); Hitachi—LG Data Storage, Inc., Tokyo (JP)

( * ) Notice: Subject to any disclaimer, the term of this patent is extended or adjusted under 35 U.S.C. 154(b) by 88 days.

(21) Appl. No.: 13/656,828

(22) Filed: Oct. 22, 2012

(65) Prior Publication Data

US 2013/0107690 A1 May 2, 2013

(30) Foreign Application Priority Data

Oct. 28, 2011 (JP) ................................. 2011-236621

(51) Int. Cl.
*G11B 20/18* (2006.01)
(52) U.S. Cl.
USPC ..................................... 369/53.41; 369/53.45
(58) Field of Classification Search
None
See application file for complete search history.

(56) References Cited

U.S. PATENT DOCUMENTS

| 7,194,364 B1* | 3/2007 | Stanley | 702/69 |
| 2002/0126410 A1* | 9/2002 | Doi et al. | 360/69 |
| 2003/0198165 A1* | 10/2003 | Mouri et al. | 369/53.35 |
| 2005/0018595 A1* | 1/2005 | Conroy et al. | 369/288 |
| 2005/0169147 A1* | 8/2005 | Kobayashi et al. | 369/53.35 |
| 2005/0265183 A1* | 12/2005 | Kakimoto et al. | 369/47.53 |
| 2006/0023595 A1* | 2/2006 | Erickson et al. | 369/53.2 |
| 2007/0086301 A1* | 4/2007 | Yamakawa | 369/59.22 |
| 2008/0089200 A1* | 4/2008 | Neckmar | 369/53.2 |
| 2009/0180369 A1* | 7/2009 | Kimmelmann et al. | 369/53.44 |
| 2010/0080097 A1* | 4/2010 | Nakamae | 369/47.15 |
| 2012/0201112 A1* | 8/2012 | Miyashita et al. | 369/53.31 |

FOREIGN PATENT DOCUMENTS

JP 2007-80363 3/2007

* cited by examiner

*Primary Examiner* — Paul Huber
(74) *Attorney, Agent, or Firm* — Antonelli, Terry, Stout & Kraus, LLP.

(57) ABSTRACT

An information recording/reproducing device capable of recording or reproducing information to or from a plurality of information recording media, includes a plurality of information recording/reproduction drives which can record or reproduce the information recording media and during recording or reproduction, can measure information recording medium quality evaluation item values representing values indicative of qualities of the information recording media; and an information recording medium monitor which can calculate tendency to quality degradation of the information recording medium from information recording medium quality evaluation item values preserved by an information recording medium monitoring database which can preserve the measured information recording medium quality evaluation item values. The information recording medium monitor is capable of calculating from a tendency to quality degradation of an arbitrary information recording medium the quality of another information recording medium.

20 Claims, 22 Drawing Sheets

FIG.14

| 1400 | 1401 | 1402 | 1103 | 1104 | 1105 | 1108 | 1110 | 1111 | 1112 |
|---|---|---|---|---|---|---|---|---|---|
| DRIVE ID | DRIVE PRESERVATION TIME | RECORDING/ REPRODUCTION OPERATION TIME | ERROR RATE | EDGE SHIFT | JITTER | SERVO SIGNAL | TENDENCY TO QUALITY DEGRADATION | INFERABLE QUALITY | QUALITY SUSTAINING TIME |

INFORMATION RECORDING/REPRODUCING DEVICE AND METHOD

INCORPORATION BY REFERENCE

The present application claims priority from Japanese application JP2011-236621 filed on Oct. 28, 2011, the content of which is hereby incorporated by reference into this application.

BACKGROUND OF THE INVENTION

The present invention relates to an information recording/reproducing device and more particularly, to a method for evaluating, in an archive device equipped with a plurality of information recording media, the quality of each of the information recording media.

JP-A-2007-80363 is available as a Patent Literature disclosing a background art in the field of the present technology. The Literature describes "A DVD drive reads out information stored in a DVD disk. A controller seeks for disk degradation information from the read-out information."

SUMMARY OF THE INVENTION

The quality of the information recording medium will be degraded owing to an external factor difficult to remove such as dusts and moisture and secular degradation as well (hereinafter, referred to as being affected by spontaneous degradation). The method described in JP-A-2007-80363 cannot afford to seek for disk degradation information of an information recording medium not participating in recording and reproduction (hereinafter, referred to as recording/reproduction) and because the frequency of recording/reproduction of the individual information recording media is small in the archive device equipped with the plurality of information recording media, the equality of a disk not undergoing recording/reproduction cannot be monitored, giving rise to a problem that the reliability of information recorded in the archive device will be impaired.

On the other hand, when pieces of disk degradation information of all of the information recording media are determined by reproducing all of the information recoding media the archive device incorporates, electric power consumption in the archive device will increase.

In the light of the aforementioned problems, the present invention has been made and has for its object to suppress the increase in electric power consumption and to promote the reliability of the recorded information in the archive device equipped with the plural information recording media.

To solve the problems as above, there is provided an information recording/reproducing device capable of recording or reproducing information to or from a plurality of information recording media, including a plurality of information recording/reproduction drives which can record or reproduce the information recording media and during recording or reproduction, can measure information recording medium quality evaluation item values representing values indicative of qualities of the information recording media; and an information recording medium monitor which can calculate tendency to quality degradation of the information recording medium from information recording medium quality evaluation item values preserved by an information recording medium monitoring database which can preserve the measured information recording medium quality evaluation item values. The information recording medium monitor is capable of calculating from a tendency to quality degradation of an arbitrary information recording medium the quality of another information recording medium.

According to the present invention, an information recording/reproducing device can be provided which can suppress the increase in consumptive electric power and can promote the reliability of the recorded information.

Other objects, features, advantageous effects and the construction will become apparent from a description given to embodiments hereinafter.

DESCRIPTION OF THE DRAWINGS

FIG. 14 is a diagram showing information recording medium quality evaluation items in embodiment 2.

DESCRIPTION OF THE EMBODIMENTS

The present invention will now be described by way of embodiments with reference to the accompanying drawings.

First Embodiment

Embodiment 1 will be described in which the present invention is applied to an archive device using optical disks (hereinafter, referred to as an optical disk archive device or simply, an archive device).

Construction and operation of the archive device in embodiment 1 will be detailed with reference to the accompanying drawings.

Figure 2:
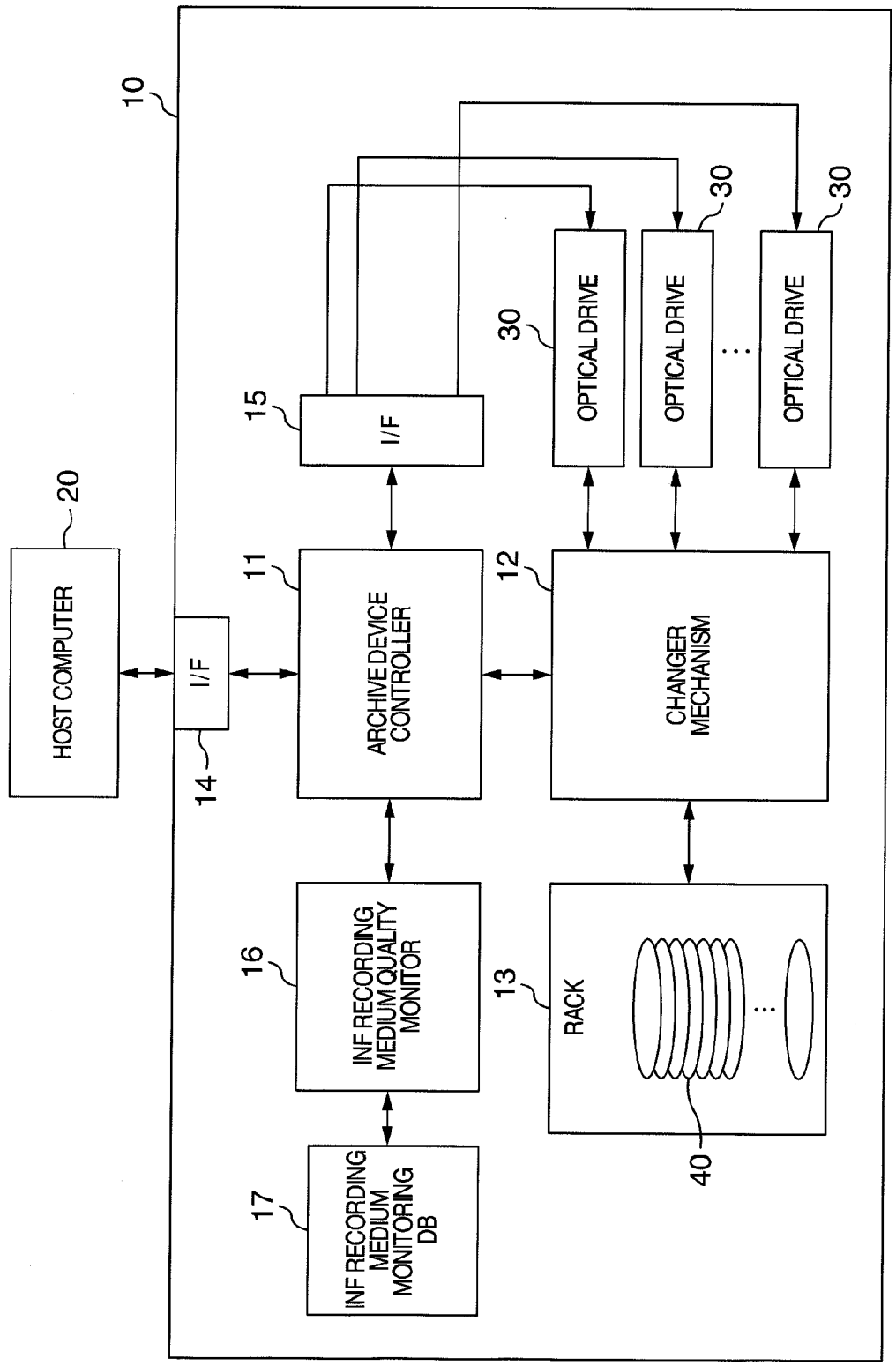
FIG. 2 is a block diagram of an information recording/reproduction device in embodiment 1.

Referring first to FIG. 2, the archive device in embodiment 1 is illustrated in block diagram form. In the following, an optical disk archive device will be described which uses an optical disk as an information (inf) recording medium and an optical drive as an information recording medium recording/reproduction drive but the information recording medium and information recording/reproduction drive to which the present invention is applicable are not limited to the above and for example, the archive device may be constituted by using as the information recording medium a magnetic recording medium or a magnetic tape medium and using as the information recording/reproduction drive a magnetic recording/reproduction drive. Also, the present invention may be applied to, for example, a hologram medium and a semiconductor memory.

The archive device, as designated at 10, according to the present embodiment comprises an archive device controller 11, a changer mechanism 12, a rack 13 for accommodating a plurality of optical disks 40, a host interface 14, a drive interface 15, an information recording medium quality monitor 16, an information recording medium monitoring database 17 and a plurality of optical drives 30.

The optical disk archive device 10 is coupled to a host computer 20 through the medium of the host interface 14 to receive and transmit various commands for recording and reproduction, results of execution of the commands and recorded and reproduced data.

The rack 13 includes a plurality of slots and optical disks 40 can be housed one by one in each of the slots.

The archive device controller 11 has the function to control the overall operation of optical disk archive device 10 and operates the changer mechanism 12, causing it to take a predetermined optical disk 40 out of the rack 13 and convey, to a predetermined optical drive 30, the optical disk which in turn is loaded on it. Or conversely, the changer mechanism 12 conveys to a predetermined slot of rack 13 an optical disk 40 ejected from a predetermined optical drive 30 so as to accommodate the optical disk in the slot. Further, the individual optical drives 30 are interconnected mutually or connected to the archive device controller 11 by way of the drive interface 15 so that the archive device controller 11 may transmit various commands for recording/reproduction and data to be recorded to the predetermined optical drive 30 and may receive therefrom results of execution of the commands and reproduced data and information recording medium quality evaluation item values as well to be described later. Also, the archive device controller 11 supplies the received information recording medium quality evaluation item values to the information recording medium quality monitor 16.

The information recording medium quality monitor 16 has the function to monitor and manage, on the basis of the information recording medium quality evaluation item values received from the archive device controller 11, qualities of all of the optical disks 40 accommodated in the rack 13. Processing commands commensurate with the results of quality monitoring are supplied to the archive device controller 11.

The information recording medium monitoring database 17 is a database adapted to hold information necessary for the information recording medium quality monitor 16 to manage the qualities of all of the optical disks 40 and their records are updated and read-out by means of the information recording medium quality monitor 16.

Details of operation of the optical disk archive device 10 will be described later.

Figure 8:
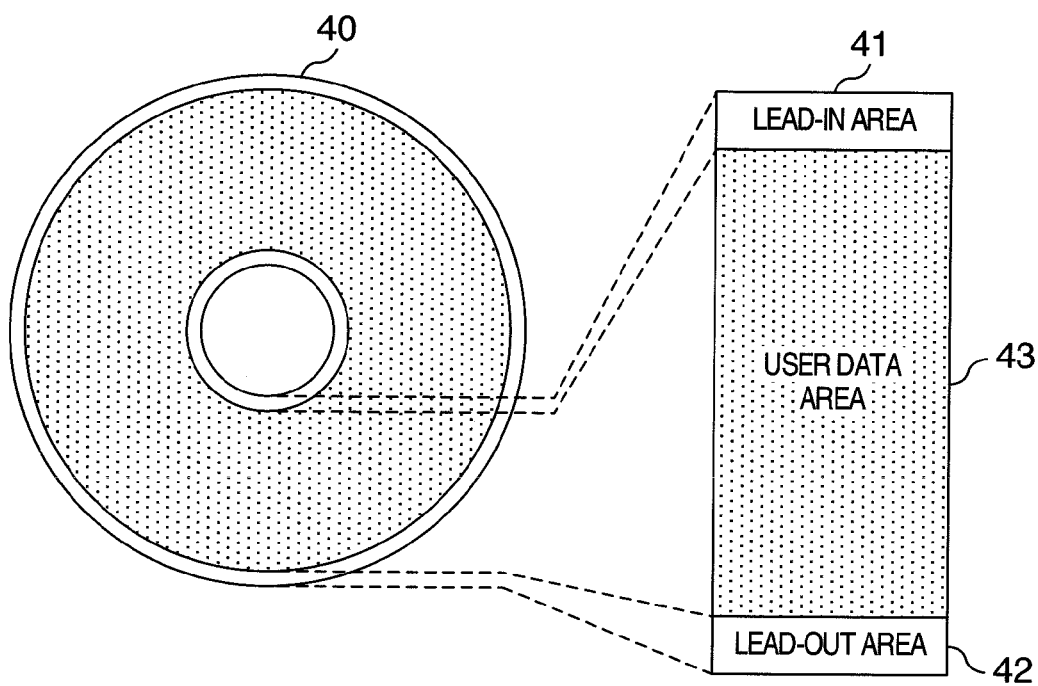
FIG. 8 is a diagram illustrative of the layout of information recording medium in embodiment 1.

Turning now to FIG. 8, structure of the optical disk 40 in embodiment 1 will be described.

The optical disk 40 is constituted by three principal areas of lead-in area 41 recorded with a disk ID, for instance, lead-out area 42 and user data area 43 necessary for the user to record/reproduce data.

Figure 3:
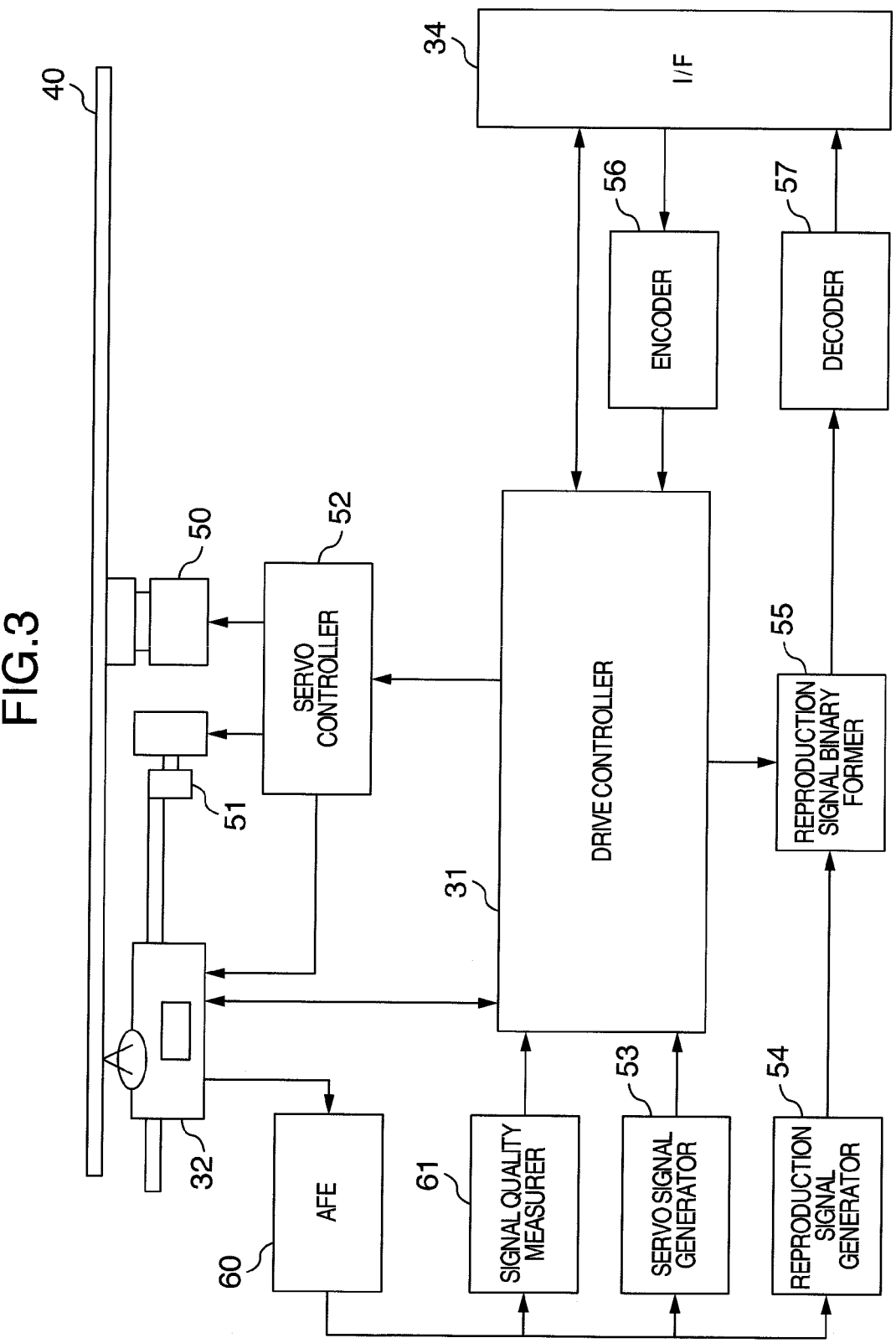
FIG. 3 is a block diagram of an information recording/reproduction drive in embodiment 1.

The optical drive 30 in embodiment 1 is illustrated in block diagram form in FIG. 3.

The optical drive 30 of the present embodiment includes a drive controller 31, an optical pickup 32, a controller interface 34, a disk rotation mechanism 50, a slider mechanism 51, a servo controller 52, a servo signal generator 53, a reproduction signal generator 54, a reproduction signal binary former 55, an encoder 56, a decoder 57, an AFE (Analog Front End) 60 and a signal quality measurer 61.

A quantity of light reflected from the optical disk 40 is received by an optical detector of optical pickup 32, converted to an electrical signal thereby and transmitted to the AFE 60.

The AFE 60 executes an analog signal process such as amplification of electrical signals received from the optical pickup and supplies amplified signals to the signal quality measurer 61, servo signal generator 53 and reproduction signal generator 54.

The signal quality measurer 61 measures beta representing amplitude center information of the shortest period signal length of signals supplied from the AFE 60, an edge shift, jitter and i-MLSE representing phase error information of the signal and a pull-in error signal (hereinafter referred to as PE) representing the total of reflected light rays, thus generating results of measurement which in turn are supplied to the drive controller 31 as information recording medium quality evaluation item values to be described later.

The servo signal generator 53 selectively generates various servo signals through a detection method suitable for a mounted optical disk 40 and supplies them to the drive controller 31 as information recording medium quality evaluation item values to be described later. The servo signal includes at least a focus error signal and a tracking error signal.

The reproduction signal generator 54 includes a waveform equalizer circuit and an A/D converter and after applying predetermined waveform equalization to the analog reproduction signals supplied from the AFE 60, executes sampling and quantization to convert them to digital signals which in turn are supplied to a reproduction signal binary former 55.

The reproduction signal binary former 55 includes a transversal filter and a Viterbi decoding circuit. Digital signals supplied from the reproduction signal generator 54 are equalized to predetermined PR class by means of the transversal filter and then, are subjected to maximum-likelihood decoding at the Viterbi-decoding circuit, so that the equalized waveform is converted into an NRZI signal based on a predetermined modulation rule. The NRZI signal generated by the reproduction signal binary former 55 is applied with a data correction process by means of the decoder 57 so as to be converted into a reproduction data signal which in turn is transmitted to the archive device controller 11 via a controller interface 34. The reproduced data contains not only user data recorded in the user data area 43 but also information such as a disk ID to be recorded on the lead-in area 41 of optical disk and is transmitted, as information obtained when reproducing the optical disk, especially, an information recording medium quality evaluation value represented by the disk ID together with the reproduced data, to the archive device controller 11 via the controller interface 34. Further, the decoder 57 has the function to report the frequency of corrections made during correction process to make it possible to measure a reproduction error rate, so that the reproduction error rate may also be transmitted as an information recording medium quality evaluation value to the archive device controller 11 by way of the controller interface 34.

The drive controller 31 controls the overall operation of optical drive 30.

During reproduction, the drive controller 31 uses a servo signal supplied from the servo signal generator 53 to control the rotation of the optical disk 40 mounted to the disk rotation mechanism 50, drive the slider mechanism 51 so as to perform seek control and transfer control for displacing the optical pickup 32 in radial direction of the optical disk 40 and to drive an objective lens of optical pickup 32 so as to perform focus control and tracking control. It is to be noted that the servo signal used for servo control is transmitted as an information recording medium quality evaluation value to the archive device controller 11 via the controller interface 34.

During recording, the drive controller 31 causes the encoder 56 to convert the recording data signal transmitted from the archive device controller 11 via the controller interface 34 into an NRZI signal pursuant to a predetermined modulation rule and supplies it to the drive controller 31 which in turn converts the NRZI signal into a corresponding recording strategy (light emitting pulse train) to thereby illuminate a laser at predetermined light intensity and in pulse train.

Figure 11:
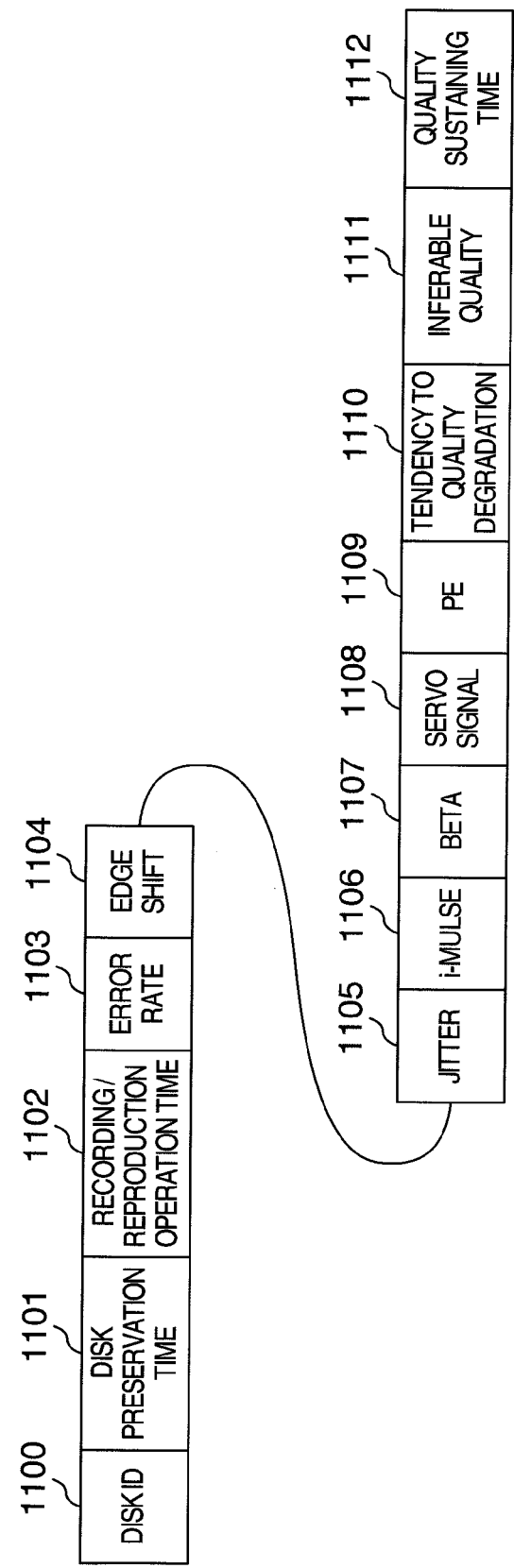
FIG. 11 is a diagram for explaining information recording medium quality evaluation items in embodiment 1.

Referring now to FIG. 11, the above-described information recording medium quality evaluation item values will be explained.

Illustrated in FIG. 11 are items to be recorded as information recording medium quality evaluation item values in the information recording medium monitoring database 17. Individual pieces of information are recorded/reproduced in respect of each of the disk ID's or added or changed each time that the quality of optical disk is inferred as will be described later. Designated by 1100 is a disk ID indicative of an ID inherent to an optical disk, by 1101 is disk preservation time corresponding to time elapsed from the start of preservation of a disk in the rack 13, by 1102 is recording/reproduction operation time indicative of duration of recording/reproduction operation, by 1103 through 1109 sequentially are an error rate, an edge shift, a jitter, an i-MULSE, a beta, a servo signal and a PE, respectively, which are obtained during recording/reproduction, and by 1110 through 1112 are a tendency to quality degradation, an inferable quality and a quality sustaining time which are to be described later. To add, pieces of information 1103 through 1109 are captured in the course of recording/reproduction and as their values, the worst value may be preserved item by item together with information indicative of an address at which recording/reproduction is conducted, an average value of individual items at recording/reproduction sites may be stored or information at the outermost periphery of a recording/reproduction area at which spontaneous degradations develop the most remarkably and accordingly, the recording/reproduction position for the information to be preserved is not limitative.

Figure 1:
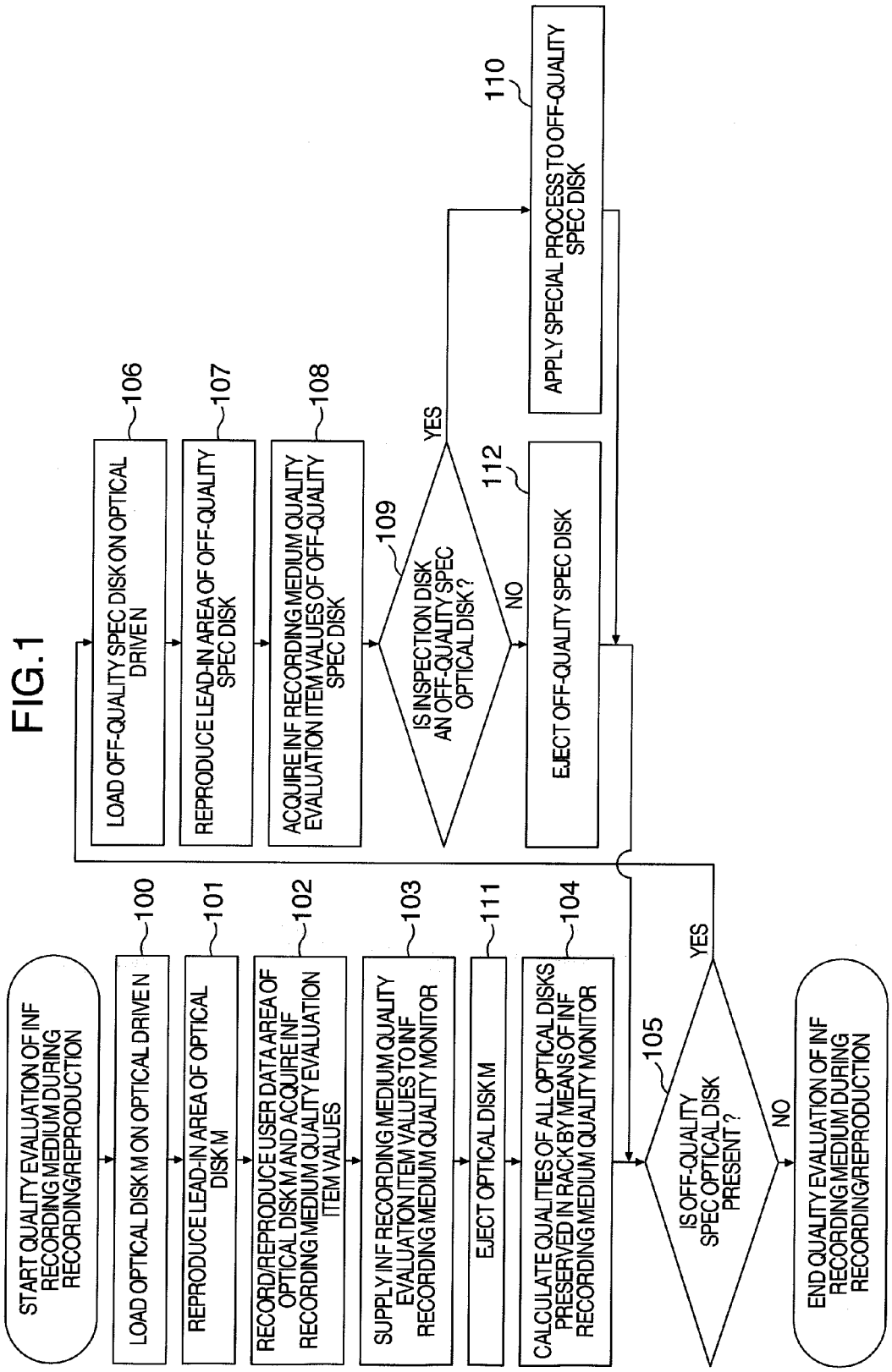
FIG. 1 is a flowchart of a process of evaluating the quality of information recording media during recording/reproduction in embodiment 1.

The optical disk archive device in embodiment 1 operates to perform a process of evaluating qualities of all of the disks during recording/reproduction as will be described below. A flowchart of the information recording medium quality evaluation process carried out during recording/reproduction operation is illustrated in FIG. 1.

Upon receipt of recording/reproduction commands from the host computer 20, the archive device controller 11 executes the quality evaluation process along with execution of the recording/reproduction process. Exemplarily, a command for recording/reproducing data to/from a particular optical disk M of the optical disks 40 is received.

The archive device controller 11 selects out of the optical drives 30 a particular optical drive N for recording/reproduction of the optical disk M and, in step 100, drives the changer mechanism 12 so as to cause it to load the optical disk M on the optical drive N.

In step 101, a lead-in area 41 of optical disk M is reproduced and particularly, a disk ID, for instance, is transmitted as an information recording medium evaluation value to the archive device controller 11.

In step 102, a user data area 43 of optical disk M is recorded and reproduced and during the recording/reproduction, the optical drive N measures information recording medium quality evaluation item values of recording/reproduction area such as beta, edge shift, jitter, servo signal, PE and i-MLSE and an error rate. In the present invention, any one of these evaluation values may be adopted. In the case of reproduction, the signal quality measurer 61 and decoder 57 measure, from reproduced data, the information recording medium quality evaluation item values and in the case of recording, after completion of recording, they measure information recording medium quality evaluation item values through a verify process for reproducing recording sites. This verify process may be applied to all areas for recording or to, out of data to be recorded, data to be recorded on the outermost peripheral side, for instance. The reason for this is because secular degradation of the information recording medium is more liable to occur on the outer peripheral side than on the inner peripheral side. The invention is, however, not limited thereto and areas for measurement of the information recording medium quality evaluation item values are not limited. The measured information recording medium quality evaluation item values are transmitted to the archive device controller 11.

Next, in step 103, the archive device controller 11 supplies the received information recording medium quality evaluation item values to the information recording medium quality monitor 16 and in step 111, causes the optical drive N to eject the optical disk M. The thus ejected optical disk M is conveyed to the rack 13 by means of the changer mechanism 12.

Subsequently, in step 104, the information recording medium quality monitor calculates tendency to quality degradation 1110, inferable quality 1111 and quality sustaining time 1112 in respect of all optical disks preserved in the rack. Detailed operation in the step 104 will be described later.

Figure 6:
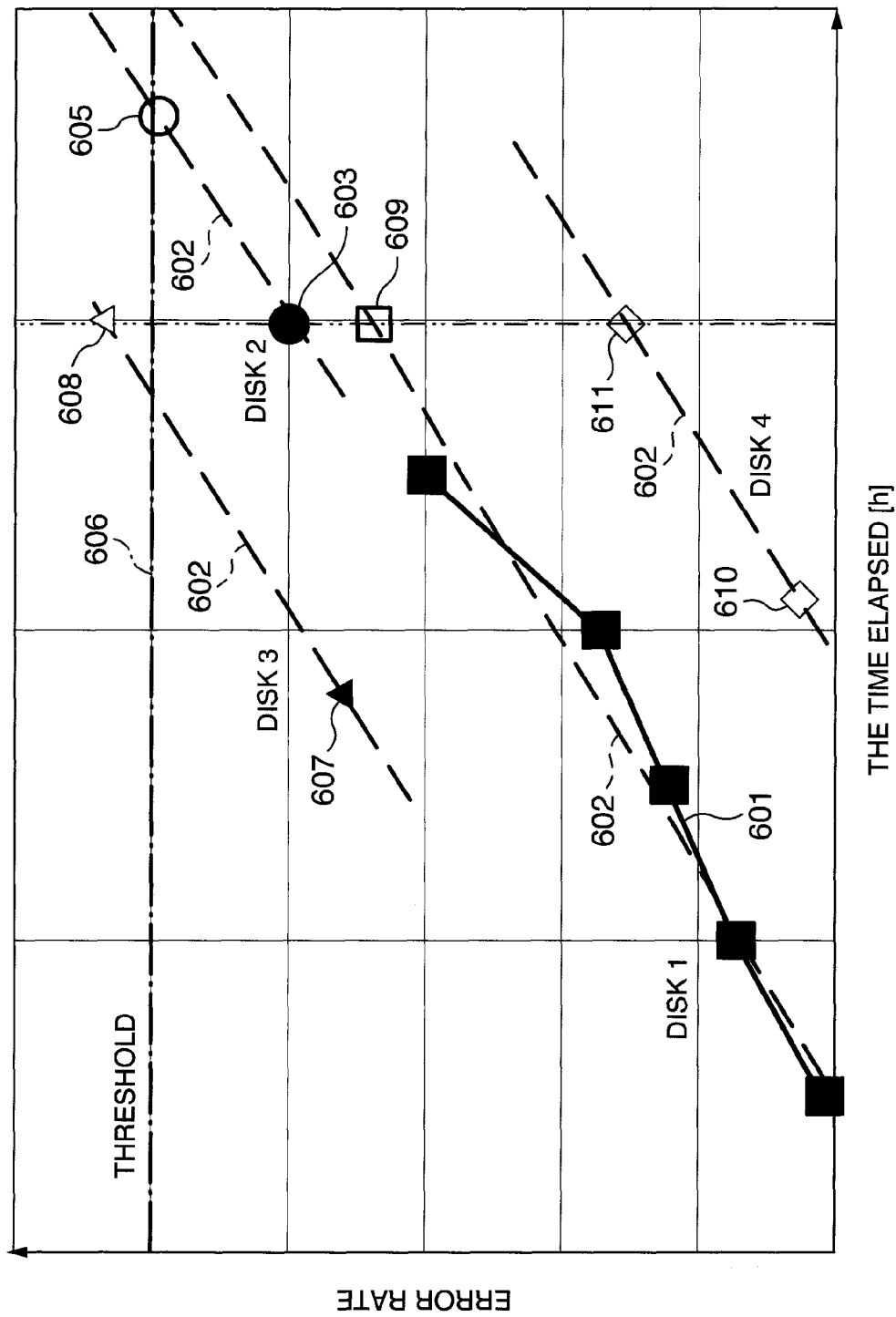
FIG. 6 is a graphic representation useful to explain the concept of a method of inferring information recording medium quality in embodiment 1.

Thereafter, in step 105, a decision is made as to whether an optical disk is present which exceeds a threshold 606 indicated in FIG. 6 in terms of inferable quality 1111 and in the absence of the optical disk, the evaluation ends but in the presence thereof, the disk is set to an off-quality specification (spec) disk and a process in step 106 is carried out.

In the step 106, the changer mechanism 12 is driven to load the off-quality specification disk on the optical drive N. In step 107, a lead-in area 41 of the above off-quality specification disk is reproduced and a disk ID, for instance, is transmitted as an information recording medium quality evaluation value to the archive device controller 11.

In step 108, information recording medium quality evaluation item values of the off-quality specification disk are captured. In respect of a disk already recorded, user data is reproduced and beta, edge shift, jitter and i-MLSE and error rate are measured which in turn are supplied as information recording medium quality evaluation item values to the archive device controller 11. In respect of an unrecorded disk, a PE signal obtained when reproducing an unrecorded area and a servo signal are measured and they are supplied as information recording medium quality evaluation item values to the archive device controller 11. The archive device controller 11 supplies the received information recording medium quality evaluation item values to the information recording medium quality monitor 16 which in turn uses the supplied information to update the information recording medium monitoring database 17 in which the information recording medium quality evaluation item values are managed disk ID by disk ID.

In step 109, the information recording medium quality evaluation item values captured in the step 108 are compared with the threshold value 606 and according to the comparison results, the optical disk is decided as to whether to be an off-quality specification optical disk. If the disk is not an off-quality specification disk, a process in step 112 is executed but if the optical disk inspected in the step 109 is so determined as to be an off-quality specification disk, a special process is executed, in step 110, for the off-quality specification disk. Detailed operation in the step 110 will be described later.

In the step 112, the archive device controller 11 causes the optical drive N to eject the optical disk M. The thus ejected optical disk M is conveyed to the rack 13 by means of the changer mechanism 12. When the process in the step 112 ends, the program returns to the process in step 105 to make a decision, from inferable qualities 1111 in step 104 of optical disks which have not yet been applied with the process in step 108, as to whether a disk determined as an off-quality specification disk is present.

A method of calculating the tendency to quality degradation 1110 in respect of all of the optical disks in the process in step 104 will be described by making reference to FIGS. 4 and 5.

Figure 4:
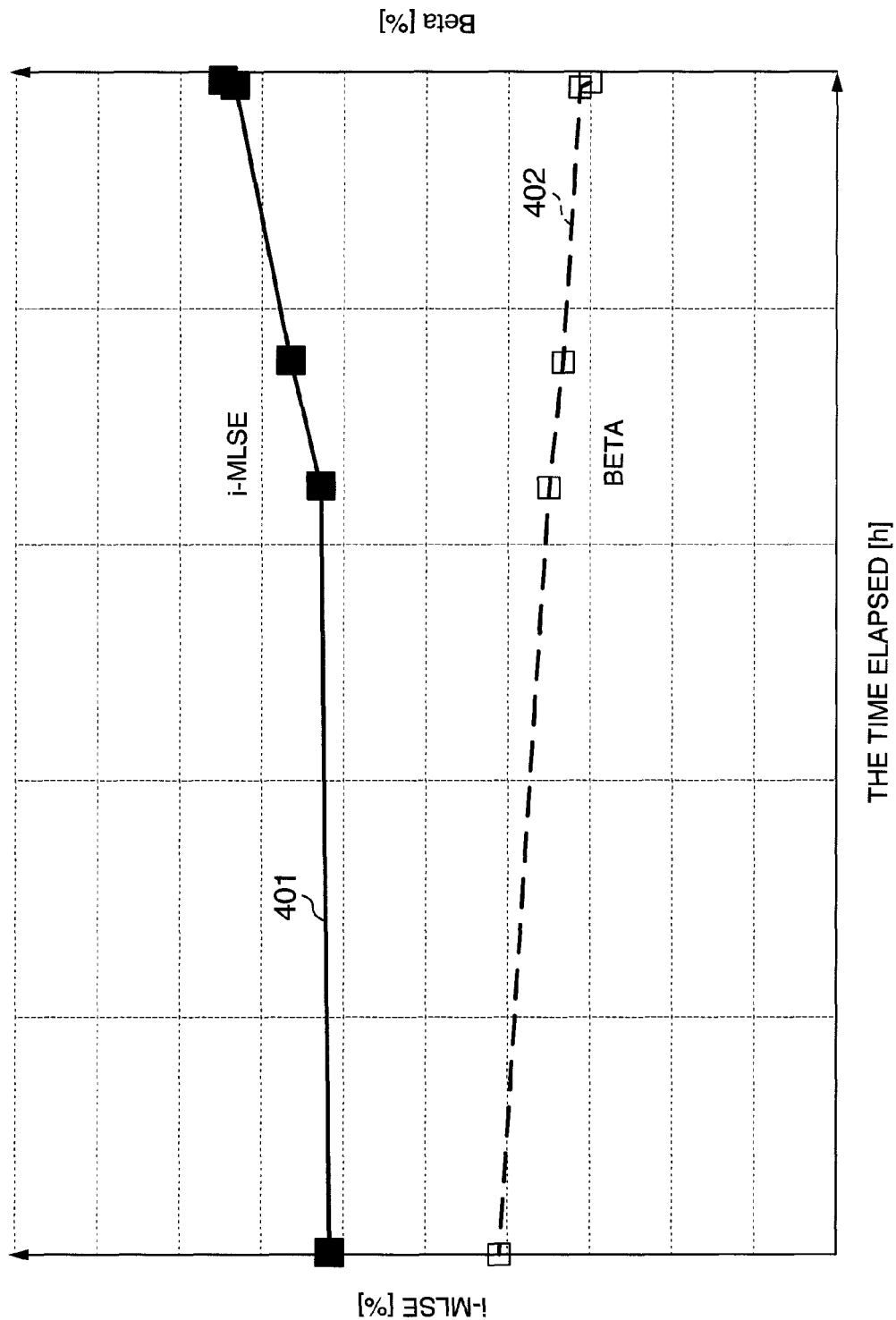
FIG. 4 is a graph illustrating characteristics of quality degradation of an information recording/reproduction medium in relation to the lapse of preservation time in embodiment 1.

Graphically illustrated in FIG. 4 is the relation between the spontaneous degradation and the i-MLSE and beta.

In FIG. 4, in relation to the lapse of time, behavior of i-MLSE changing owing to a factor of spontaneous degradation only is illustrated at 401 and behavior of beta changing owing to a factor of spontaneous degradation only is illustrated at 402.

As will be seen from FIG. 4, the i-MLSE affected by spontaneous degradation increases abruptly at a time-lapse point and the beta decreases with the time lapse.

Figure 5:
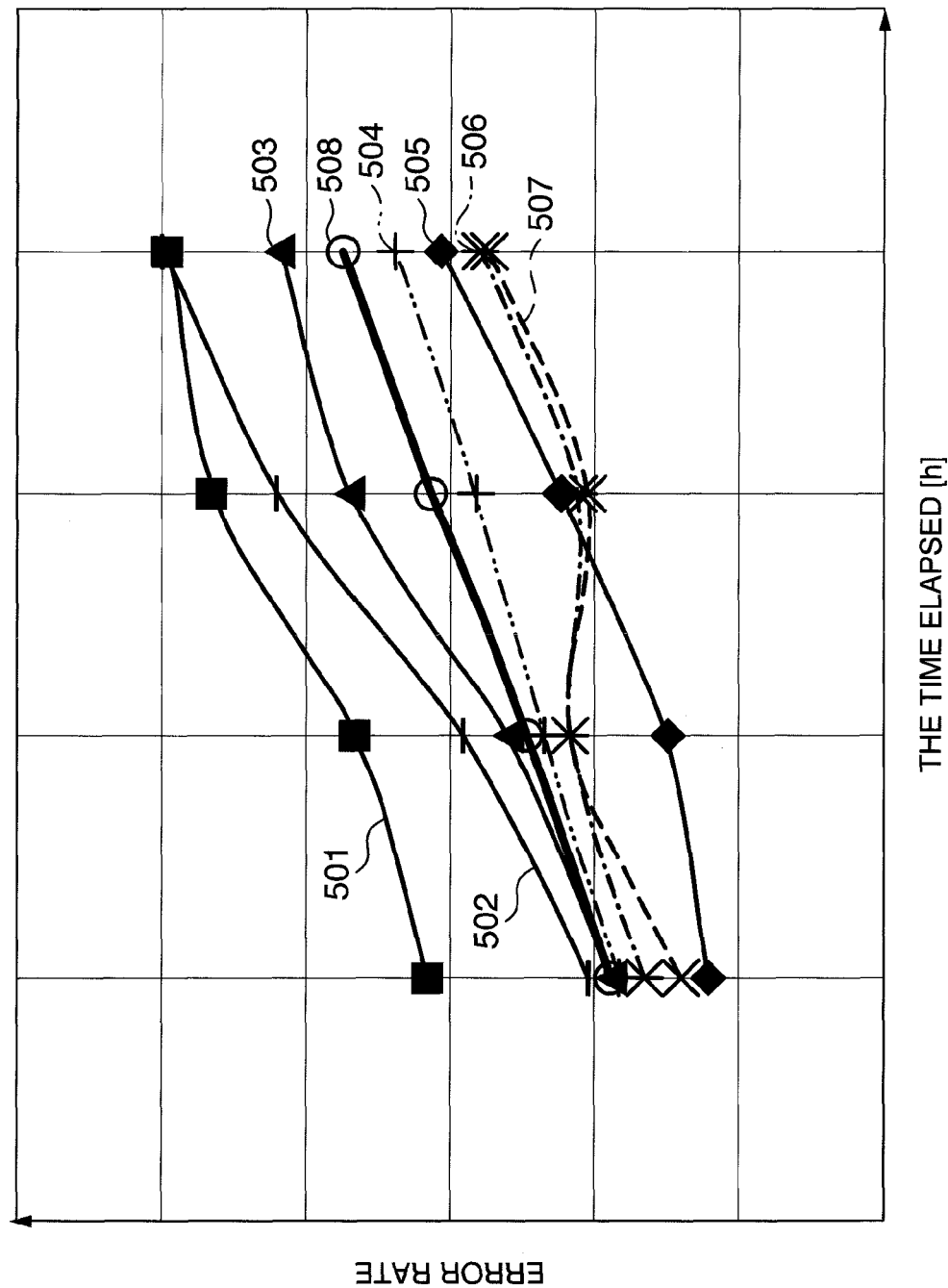
FIG. 5 is a graph illustrating characteristics of quality degradation of information recording/reproduction media in relation to the lapse of preservation time in embodiment 1.

Graphically illustrated in FIG. 5 is the relation between the error rate changing owing to only a factor of spontaneous degradation in relation to lapse of time. Behaving conditions of the error rate change by a factor of spontaneous degradation in relation to lapse of time in the individual optical disks are designated by behavior conditions 501 through 507 and an average of tendencies to quality degradation 501 to 507 all of the optical disks have is designated by 508.

As shown in FIG. 5, the error rate due to spontaneous degradation has such characteristics that are aggravated linearly in relation to the time lapse.

The tendency to quality degradation 1110 is calculated by using the characteristics as shown in FIGS. 4 and 5. Next, a method of calculating the inferable quality 1111 and quality sustaining time 1112 of all of the optical disks will be explained with reference to FIG. 6.

For example, in a condition that the error rate 601 of optical disk 1 and the error rate 607 of optical disk 3 which are shown in FIG. 6 are preserved in the information recording medium monitoring database 17, information recording medium quality evaluation value 603 of optical disk 2 is captured, tendencies to quality degradation 602 of all of the optical disks are calculated pursuant to the aforementioned method, qualities 608 and 609 at present are calculated by applying to the optical disks 1 and 3 the tendency to quality degradation calculated previously, and values of the qualities 608 and 609 are set as inferable quality 1111. Here, in case where an unrecorded disk 4 is present whose old information recording medium quality evaluation item values have not been recorded in the information recording medium monitoring database 17, information recording medium initial quality information 610 of a preset optical disk and the previously calculated tendency to quality degradation 602 of all of the optical disks are used for the unrecorded optical disk to calculate its inferable quality 611. In an alternative, the inferable quality 611 may be calculated from a preset tendency to quality degradation, though not illustrated.

After the qualities of 608, 609 and 611 at present have been inferred, an elapse time 605 for reaching a threshold 606 adapted to judge an optical disk of good quality or an optical disk of bad quality is then calculated in respect of each of the optical disks, and results of calculation are saved as quality sustaining time 1112 in the information recording medium monitoring database 17.

Figure 9:
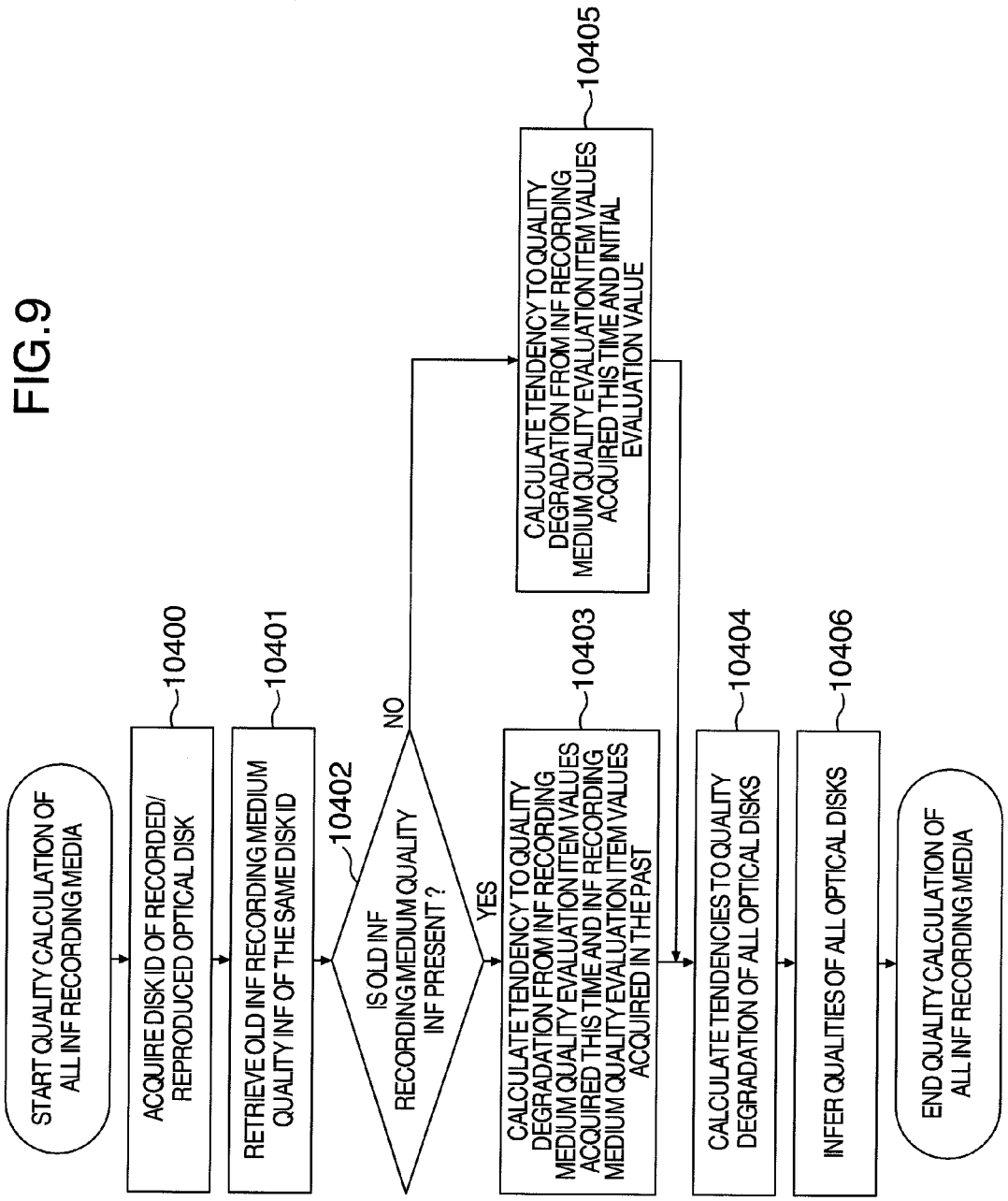
FIG. 9 is a flowchart of a process of calculating qualities of all of the information recording media in embodiment 1.

Turning now to FIG. 9, flow of the process will be explained in greater detail which is operated in the step 104 to calculate the tendency to quality degradation 1110, inferable quality 1111 and quality sustaining time 1112 in respect of all of the optical disks.

Illustrated in FIG. 9 is a flowchart of the process of calculating the tendency to quality degradation 1110, inferable quality 1111 and quality sustaining time 1112 in respect of all of the optical disks. After capturing information recording medium quality evaluation item values of an optical disk having undergone recording/reproduction, the information recording medium quality monitor first acquires in step 10400 a disk ID of the recorded/reproduced optical disk and searches old information recording medium quality evaluation item values of the acquired disk ID in the information recording medium monitoring database 17 in step 10401. In step 10402, a decision is made as to whether the old information recording medium quality evaluation item values of the disk ID acquired this time are recorded in the information recording medium monitoring database. If recorded, the information recording medium quality evaluation item values acquired this time are additionally registered in the information recording medium monitoring database 17 and then, the program proceeds to a process in step 10403. If unrecorded, the information recording medium quality evaluation item values acquired this time are newly registered in the information recording medium monitoring database 17 and then, a process in step 10405 is executed.

In the step 10403, from the information recording medium quality evaluation item values acquired this time and the information recording medium quality evaluation item values acquired in the past, an exponential function approximation is carried out in relation to the lapse of time in the case of, for example, i-MLSE or a linear approximation is carried out in relation to the lapse of time in the case of, for example, beta or error rate so as to calculate tendency to quality degradation 1110 of the recorded/reproduced optical disk, as has been described in the foregoing, and the thus calculated tendency to quality degradation 1110 is saved in the information recording medium monitoring database 17 disk ID by disk ID.

In the step 10405, from the information recording medium quality evaluation item values acquired this time as described previously and a predetermined initial value or predetermined tendency to quality degradation to be recorded in the information recording medium monitoring database 17, a tendency to quality degradation 1110 is calculated as in the case of the step 10403 and the thus calculated tendency to quality degradation 1110 is saved in the information recording medium monitoring database 17 disk ID by disk M.

To add, in a method for calculating the tendency to quality degradation 1110, an exponential function approximation is carried out in relation to the lapse of time in the case of i-MLSE or a linear approximation is carried out in relation to the lapse of time in the case of beta or error rate as described previously but the quality degradation calculation method as above is not limitative and for example, a tendency to change of i-MLSE may be calculated by using the linear approximation. Also, the index used for the tendency to quality degradation has been described as being i-MLSE, beta or error rate but alternatively, jitter, edge shift or a servo signal or PE used in inferring the quality of an unrecorded disk to be described later may be used. In calculation, all of the information recording medium quality evaluation item values acquired this time and those acquired in the past disk ID by disk ID may be used or part of them may be used to calculate the tendency to quality degradation and the calculation method is not limitative.

Further, the tendency to quality degradation 1110 to be registered in the information recording medium monitoring database 17 is expressed by, for example, a mathematical expression calculated by using the approximation calculation as above. When, for example, the error rate is used as the information recording medium quality evaluation value, the mathematical expression to be saved may be determined by applying linear primary interpolation to the time so as to reckon a linear primary approximation expression and by using only the degree and coefficients of the calculated approximation expression or alternatively, by using a general expression. When, for example, the i-MLSE is used as the information recording medium quality evaluation value, the mathematical expression to be used may be determined by applying exponential approximation to the time so as to reckon an approximation expression and by using only coefficients of the calculated approximation expression or alternatively, by using a general expression.

After the tendency to quality degradation 1110 of the recorded/reproduced optical disk has been calculated in the step 10403 or 10405, tendencies to quality degradation of all of the optical disks are then calculated in step 10404. The tendency to quality degradation of all optical disks may be determined as an average of quality degradation tendencies of all of the optical disks as shown at 508 in FIG. 5, for instance, may be determined as the largest tendency to quality degradation or may be determined as a tendency to quality degradation of an arbitrary optical disk. Further, tendencies to quality degradation 1110 of all optical disks may be a value in common to all of the disk, may be held disk ID by disk ID or may be sorted into groups in accordance with disk sustaining time 1101, for instance.

Subsequent to completion of calculation of the tendency to quality degradation 1110 of all optical disks, inferable qualities 1111 representing the qualities at present of all of the optical disks are calculated in step 10406. It will be appreciated that inferable qualities 1111 of all of the optical disks need not always be calculated but calculation of an inferable quality 1111 of at least one optical disk may suffice for the present invention.

When qualities of all of the optical disks have been inferred in the step 10406, the quality calculation of all information recording media ends and a process in the step 105 in FIG. 1 is dealt with. The error rate in information recording medium quality evaluation item values has been described as being used for calculating the inferable quality 1111 and quality sustaining time 1112 but information used as information recording quality information is not limited to the above but the i-MLSE, beta, jitter, PE or servo signal may be used.

Figure 7:
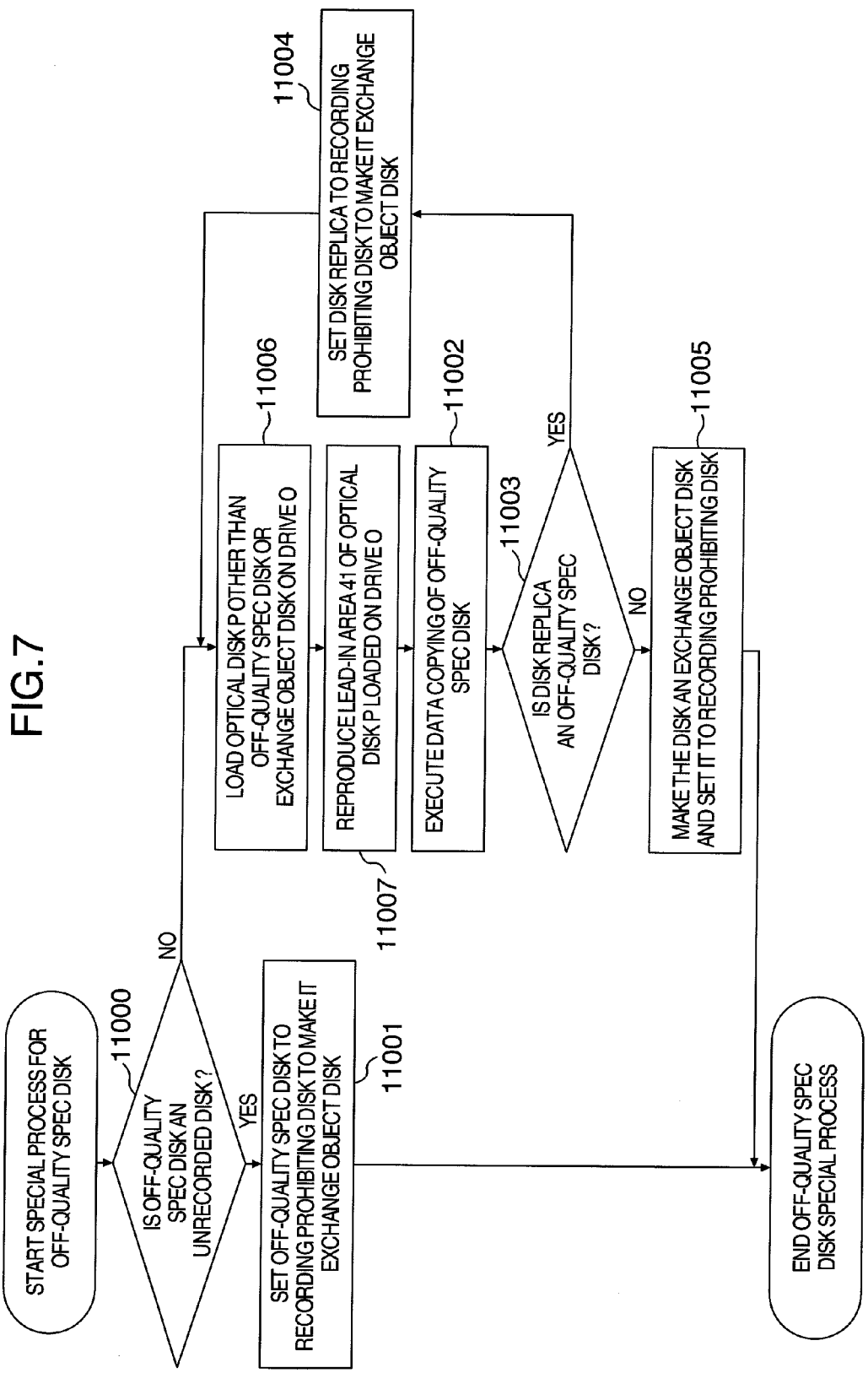
FIG. 7 is a flowchart of a special process for an off-quality specification recording medium in embodiment 1.

A process for specifically processing the off-quality specification disk in the step 110 will be described in greater detail by reverting to FIG. 7.

Firstly, a decision is made in step 11000 as to whether the disk is an unrecorded disk and if the unrecorded disk is present, a process in step 11001 is executed but if a recorded disk is present, a process in step 11006 is executed.

In the step 11001, a process is carried out in which an off-quality specification disk is set as a recording prohibiting disk which in turn is prevented thereafter from being recorded and ejected from the optical archive device as an exchange objective disk which is to be exchanged with a new disk. Also, to the information recording medium quality evaluation item values recorded in the information recording medium monitoring database 17 concerning the optical disk set as the exchange objective disk, setting to the exchange objective disk is added and the information recording medium quality evaluation item values of the off-quality specification disk may either be excluded when calculating the tendency to quality degradation 1110, inferable quality 1111 and quality sustaining time 1112 of all optical disks or otherwise used. Time to execute the process for exchanging the disk set as the exchange objective disk may be a time point at which the number of exchange objective disks amounts up to a constant value or may be determined periodically, and the time to exchange is not limitative.

When the disk set to the exchange objective disk is not exchanged immediately, that disk is once ejected from the optical drive N and the ejected exchange objective disk is place temporarily in the custody of the rack 13 by means of the changer mechanism 12. For a newly added disk, tendency to quality degradation 1110, inferable quality 1111 and quality sustaining time 1112 inclusive of the information recording medium quality evaluation item values of information recording medium held till then may be calculated or the values 1110 through 1112 may be calculated each time that optical disks are added at intervals of times for preservation of the optical disks.

When setting the recording prohibiting disk and the exchange objective disk is finished in respect of the off-quality specification disk, the special process for the off-quality specification disk ends.

In step 11006, an optical disk P not determined as an off-quality specification disk in the step 105 or an optical disk P not determined as a recording prohibiting disk in the step 11004 is loaded on an optical disk drive 0 out of the optical disk drives 30 and in step 11007, a lead-in area 41 of the optical disk P loaded on the drive 0 is reproduced so that especially, a disk ID, for instance, may be transmitted as an information recording medium quality evaluation value to the archive device controller 11. Here, an explanation will be given to the reliability of data obtained by reproducing the optical disk set to the off-quality specification disk. Generally, an information recording medium used in the archive device is required to have a higher quality than an information recording medium for use in public welfare and therefore, a value of threshold 606 for use in the archive is set to be lower than the value of threshold 606 for use in public welfare. Accordingly, even an optical disk set as an off-quality specification disk in the process in the step 105 will not be treated as being unable to be reproduced and besides, the threshold 606 is so set as not to generate a reproduction incapable optical disk.

In step 11002, a drive N first reproduces all data to be recorded in the off-quality specification disk and reproduced data are sequentially transmitted to the archive device controller 11. The archive device controller 11 sequentially supplies the received reproduced data, as recording data, to the optical drive 0 which in turn sequentially records the received data in optical disk P, thus preparing a replica of the off-quality specification disk. In recording operation during the disk replica preparation, a verify process of alternately repeating recording and reproduction as in the recording operation in the step 102 shown in FIG. 1 is carried out to acquire information recording medium quality evaluation item values during the recording operation.

In step 11003, a decision is made as to whether the optical disk replica P prepared by using the information recording medium quality evaluation item values acquired in the step 11002 is an off-quality specification disk and if the optical disk replica P is not an off-quality specification disk, a process in step 11005 is executed but if the optical disk replica P is an off-quality specification disk, the process in the step 11004 is carried out.

In the step 11005, a process similar to that in the step 11001 is carried out and after completion of the process in the step 11005, the optical disk replica P is conveyed to the rack 13 by using the changer mechanism 12 and the special process for the off-quality specification disk ends.

In the step 11004, process similar to that in the step 11001 or 11005 is carried out and after completion of the process, the process in the step 11006 is executed.

When the special process for the off-quality specification disk ends, the program returns to the step 105 in which a decision is made as to whether out of the off-quality specification disks, an optical disk not applied with the processes in the steps 106 through 108 is present and if the absence is determined, the evaluation ends but if the presence is determined, the process in the step 106 is executed as described previously.

The information recording medium quality evaluation in the course of operation of the optical disk archive device 10 in the mode other than the recording/reproduction will be described.

Figure 10:
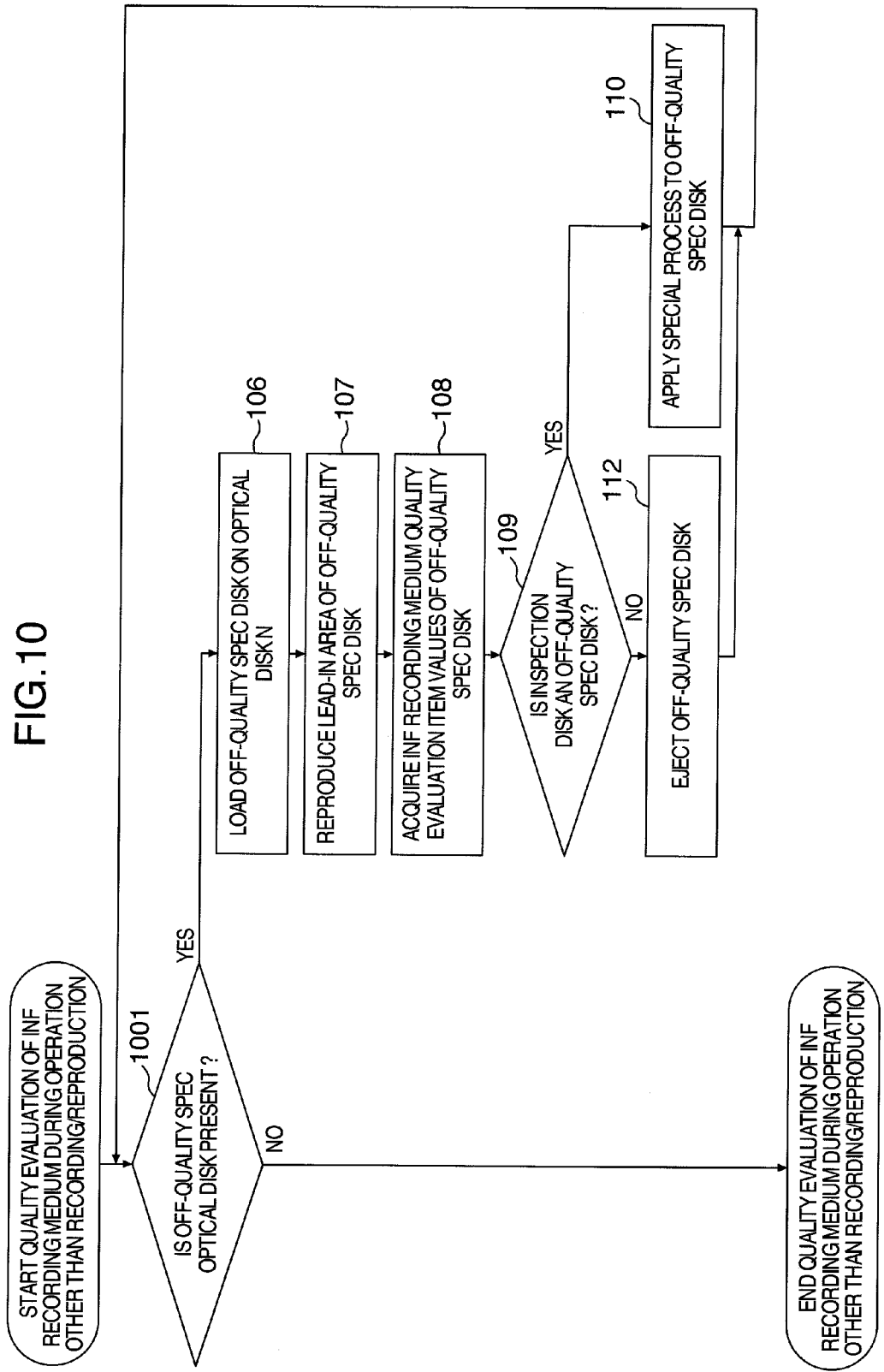
FIG. 10 is a flowchart of a process of evaluating the quality of information recording medium during operation other than recording/reproduction in embodiment 1.

Referring now to FIG. 10, a flowchart of a process of evaluating information recording medium quality during operation of the optical disk archive device 10 in the mode other than the recording/reproduction will be described. Identical processes to those in the flowchart of the process for information recording medium quality evaluation executed during recording/reproduction operation shown in FIG. 1 will be designated by identical reference signs and their operation will not be described.

In step 1001, the information recording medium quality monitor 16 compares quality sustaining time 1112 with disk sustaining time 1101 in FIG. 11 of all optical disks which are recorded in the information recording medium monitoring database 17 and when the comparison result shows that the quality sustaining time 1112 exceeds the disk preserving time 1101, the quality evaluation of information recording medium during operation other than recording/reproduction ends but when the quality sustaining time is below the disk preserving time 1101, a process in the step 106 is executed.

Processes in steps 106 through 110 and step 112 are similar to those in the steps 106 through 110 and step 112 in FIG. 1.

Evaluations during operation other than recording/reproduction may be executed constantly while the optical disk library is kept started. Also, the evaluations may be executed either periodically or upon receipt of commands from the host computer shown in FIG. 2, or the information recording medium monitoring database is provided with the function to output an alarm signal when the quality sustaining time 1112 decreases to below the disk preserving time 1112, thereby ensuring that the processes shown in FIG. 10 can be executed. In this manner, consumptive electric power can be reduced and the operation for monitoring the quality of the information recording medium can be mitigated. The above is not limitative in the present invention and excepting the time interval of recording/reproduction, the time to perform evaluation is not limited.

Further, when the optical archive device does not perform recording/reproduction and information recording medium quality evaluation item values are not at all recorded in the information recording medium monitoring database, the information recording medium quality monitor 16 compares a predetermined initial quality sustaining time with the lapse time so that a process similar to that in the step 1001 can be carried out.

As described above, by acquiring the information recording medium quality evaluation item values during ordinary recording/reproduction operation, calculating from the acquired results a tendency to quality degradation of the information recording medium and inferring the quality of information recording medium from the calculated tendency to quality degradation, the process for monitoring information recording medium quality can be mitigated to a great extent and the quality of the information recording medium preserved in the archive device can be monitored, thus improving the reliability of data to be recorded in the archive device.

The present invention is effective especially for the archive device equipped with the changer mechanism. When, in the device having the changer mechanism, all information recording media the archive device has are reproduced to determine pieces of degradation information of all of the information recording media, the changer mechanism must convey the information recording media sequentially to the recording/reproduction device and consequently, consumptive electric power of the archive device is particularly increased. The processing time is also increased. By using the present invention, on the other hand, the consumptive electric power of archive device and the processing time can be reduced and besides, the reliability of the information can be promoted.

Second Embodiment

Embodiment 2 will be described in which the present invention is applied to an archive device using a hard disk drive (hereinafter referred to as HDD).

Construction and operation of an archive device according to embodiment 2 will be described in greater detail with reference to the accompanying drawings.

Figure 12:
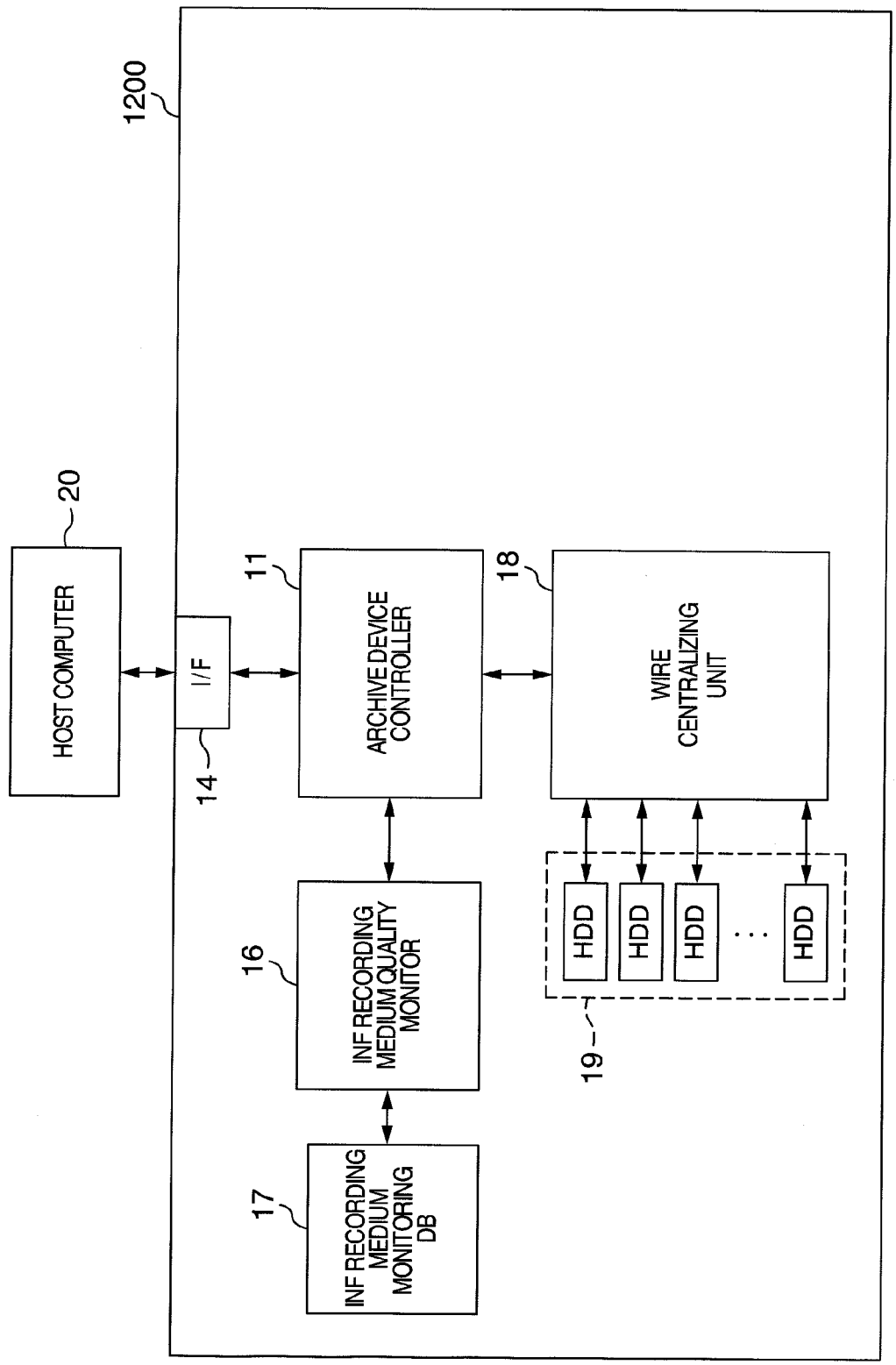
FIG. 12 is a block diagram of an information recording/reproduction device in embodiment 2.

The archive device in embodiment 2 is illustrated in FIG. 12 in block diagram form. In the present embodiment, the archive device will be explained as using a HDD in which an information recording/reproduction drive is integral with an information recording medium, but this is not limitative and the integration of the information recording/reproduction drive with the information recording medium only is essential and for example, an archive device using an optical drive in which the information recording/reproduction drive is integral with the information recording medium may suffice.

Only points differing from those in embodiment 1 will be described hereinafter and parts having the same function as that of parts in the foregoing Figures will be designated by identical reference signs and their repetitive explanation will be omitted.

An archive device controller 11 has the function to control the overall operation of an archive device 1200 and records/reproduces data to/from a HDD in accordance with instructions and commands received from a predetermined host computer 20 through the medium of a wire centralizing unit 18. Further, during recording/reproduction to/from a HDD 19, the HDD 19 supplies recorded/reproduced data and information recording medium quality evaluation item values obtained during recording/reproduction to the archive device controller 11 via the wire centralizing unit 18.

Figure 13:
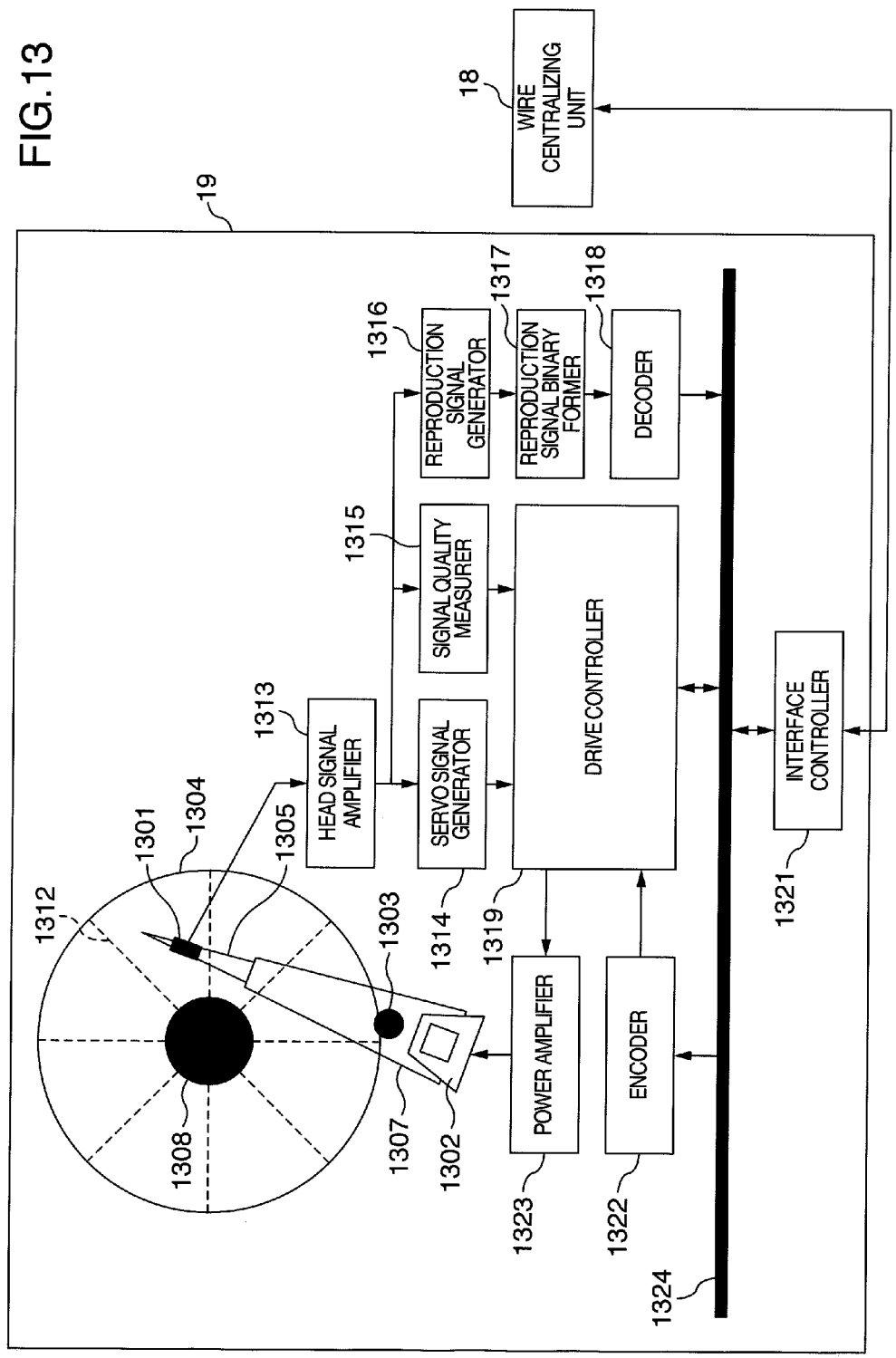
FIG. 13 is a block diagram of an information recording/reproduction drive in embodiment 2.

The information recording/reproduction drive integral with an information recording medium in embodiment 2 is constructed as illustrated in block diagram from in FIG. 13.

A HDD 19 in the present embodiment includes a magnetic head 1301, a voice coil motor (hereinafter referred to as VCM) 1302, a pivot bearing 1303, a magnetic disk 1304, a head supporting spring 1305, a carriage 1307, a spindle motor 1308, servo sectors 1312, a head signal amplifier 1313, a servo signal generator 1314, a signal quality measurer 1315, a reproduction signal generator 1316, a reproduction signal binary former 1317, a decoder 1318, a drive controller 1319, an interface controller 1321, an encoder 1322, a power amplifier 1323 and a bus 1324.

The spindle motor 1308 is fixedly mounted to a base, not shown, and rotates at a predetermined speed. The magnetic disk 1304 representing an information recording medium is fixed to the spindle motor 1308. On the side of the magnetic disk 1304 fixed to the spindle motor 1308, the pivot bearing 1303 is so arranged as to be parallel to the spindle motor shaft. A member for holding the magnetic head 1301 is constituted by the head supporting spring 1305 and carriage 1307 and is pivotally mounted to the pivot bearing 1303. Power for moving the magnetic head 1301 is generated by the VCM 1302. Each of the magnetic disk 1304 and the magnetic head 1301 is not limited to one in number but may be provided in plural number not shown and when a plurality of magnetic disks 1304 exist, the magnetic heads 1301 are provided correspondingly to the number of magnetic disks 1304.

A drive coil in the VCM 1302 is fixed to the carriage 1307. A head actuator adapted for positioning the magnetic head 1301 is constituted by the magnetic head 1301, head supporting spring 1305, carriage 1307, pivot bearing 1303 and VCM 1302.

Information reproduced from the magnetic disk 1304 by means of the magnetic head 1301 is transmitted to the servo signal generator 1314, signal quality measurer 1315 and reproduction signal generator 1316 via the head signal amplifier 1313.

The signal quality measure 1315 measures from a signal supplied from the head signal amplifier 1313, an edge shift, a jitter and a servo signal representing a phase error information of reproduced signal information, thereby generating results of measurement which in turn are supplied, as information recording medium quality evaluation item values to be described later, to the drive controller 1319.

The servo signal generator 1314 detects, through the head signal amplifier 1313, servo information recorded in an area of the servo sector 1312 which is arranged in radial form on the magnetic disk 1304 and supplies the information, as information recording medium quality evaluation item values to be described later, to the controller 1319.

The reproduction signal generator 1316 is constituted by a waveform equalizer circuit and an A/D converter and applies a predetermined waveform equalization to an analog reproduced signal supplied from the head signal amplifier 1313 and thereafter, samples and quantizes the analogue reproduced signal to convert it to a digital signal which in turn is supplied to the reproduced signal binary former 1317.

The reproduced signal supplied to the reproduced signal binary former 1317 is converted to an NRZI signal based on a predetermined modulation rule by means of a means suitable for the reproduced signal. The NRZI signal generated by the reproduced signal binary former 1317 is applied with a process of correcting data by means of the decoder 1318 so as to be converted into a reproduced data signal which in turn is transmitted to the archive device controller 11 via the bus 1324, interface controller 1321 and wire centralizing unit 18. The decoder 1318 has the function to report the frequency of corrections in the correction process, having the ability to measure reproduction error rate, and transmits the reproduction error rate, as the information recording medium quality evaluation item values to be described later, to the archive device controller 11 via the interface controller 1321.

The drive controller 1319 controls the overall operation of HDD 19. During reproduction, the drive controller 1319 controls rotation of the magnetic disk 1304 mounted to the spindle motor 1308 by using a servo signal supplied from the servo signal generator 1314 and performs seek control and feed control for displacing the magnetic head 1301 and magnetic disk 1304 in radial direction by driving the head supporting spring 1305, carriage 1307, pivot bearing 1303 and VCM 1302, thus causing the magnetic head 1301 to follow the reproduction position. To add, the servo signal used for servo control is transmitted, as the information recording medium quality evaluation item values, to the archive device controller 11 via the bus 1324, interface controller 1321 and wire centralizing unit 18.

During recording, the drive controller 1319 causes the encoder 56 to convert a recording data signal transmitted from the archive device controller 11 via the interface controller 1321 to an NRZI signal based on a predetermined modulation rule and supplies it to the drive controller 1319. Then, the drive controller 1319 supplies a recording control signal corresponding to the NRZI to the power amplifier 1323. The power amplifier 1323 generates a current command signal in accordance with the thus supplied recording control signal to stipulate a VCM drive current so as to perform predetermined magnetic recording.

To add, during recording/reproduction, the drive controller 1319 supplies to the controller 11 a drive ID inherent to each drive along with the information recording medium quality evaluation item values.

The previously described information recording medium quality evaluation item values will now be explained by using FIG. 14.

In FIG. 14, the information recording medium quality evaluation item values are indicated as items to be recorded in the information recording medium monitoring database 17 and respective pieces of information are added/updated in respect of the individual drive ID's each time that recording/reproduction is executed or the quality of the HDD to be described later is inferred in respect of the individual drive ID's. Designated by 1400 is a drive ID indicative of an ID inherent to the HDD, by 1401 is a drive preservation time indicative of time elapsing from start of preservation of the HDD in the archive device, by 1402 is recording/reproduction operation time indicative of time through which recording/reproduction is conducted, by 1103 through 1105 and 1108 are error rate, edge shift, jitter and servo signal, respectively, as in the case of embodiment 1 and by 1110 through 1112 are items identical to those defined in embodiment 1, particularly indicating in embodiment 2 tendency to quality degradation, inferable quality and quality sustaining time of the HDD.

Figure 15:
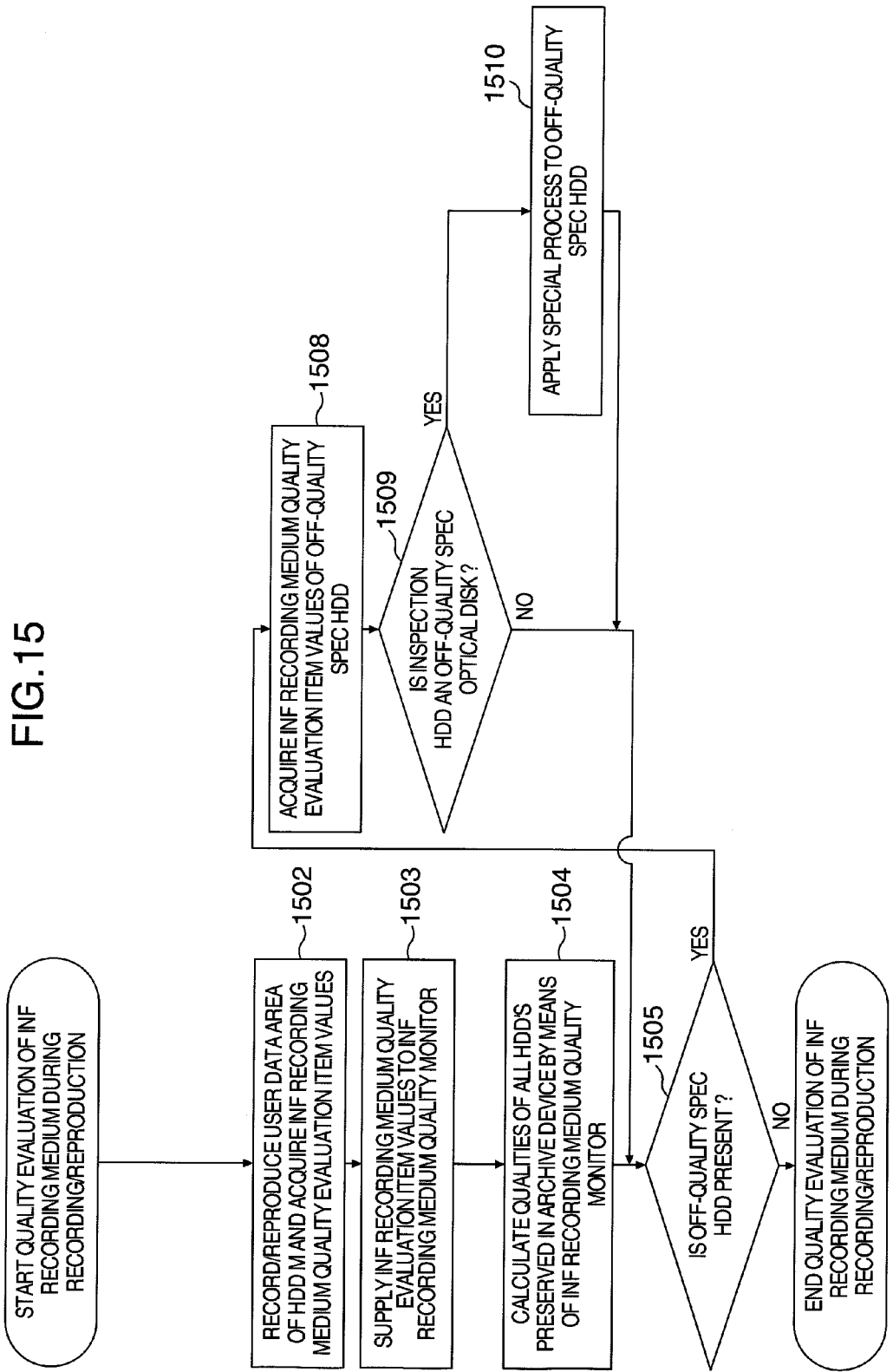
FIG. 15 is a flowchart of a process of evaluating the quality of information recording media during recording/reproduction in embodiment 2.

How the archive device in embodiment 2 operates in a process of evaluating qualities of all HDD's during recording/reproduction will be described. Illustrated in FIG. 15 is a flowchart of a process for evaluating qualities of the HDD's to be executed during recording/reproduction operation in embodiment 2.

When receiving a recording/reproduction command from the host computer 20, the archive device controller 11 executes the quality evaluation process along with execution of the recording/reproduction process. Assumptively, a command for recording/reproducing data to/from a HDD M out of the HDD's 19 is received.

In step 1502, data is recorded/reproduced to/from the HDD M and during recording/reproduction, the HDD M measures information recording medium quality evaluation item values such as edge shift of the recording/reproduction area, jitter and servo signal and error rate. In the case of reproduction, from reproduced data, the signal quality measurer 1315 and decoder 1318 measure the information recording medium quality evaluation item values and in the case of recording, measure the information recording medium quality evaluation item values through a verify process in which a recorded area is reproduced after recording. The verify process may be applied to all areas to be recorded or data to be recorded on the outermost periphery, for example, out of data to be recorded and so the area in which the information recording medium quality evaluation value is measured is not limitative. The thus measured information recording medium quality evaluation item values are transmitted to the archive device controller 11.

Next, in step 1503, the archive device controller 11 supplies the received information recording medium quality evaluation item values to the information recording medium quality monitor 16.

In step 1504, the information recording medium quality monitor calculates tendency to quality degradation 1110, inferable quality 1111 and quality sustaining time 1112 of all of the HDD's being in the custody of the archive device by using a method similar to that in the step 104 in embodiment 1 shown in FIG. 1.

In step 1505, it is decided whether a HDD for which the inferable quality 111 exceeds a predetermined threshold value is present and if absent, the evaluation ends but if present, the HDD is set to an off-quality specification HDD and a process in step 1508 is executed.

In the step 1508, information recording medium quality evaluation item values of the off-quality specification HDD are acquired by using a method similar to that in the step 108 in embodiment 1 shown in FIG. 1.

In step 1509, the information recording medium quality evaluation item values are compared with the aforementioned predetermined threshold value and a decision is made in accordance with the results of comparison as to whether the HDD is an off-quality specification HDD. If the HDD is not an off-quality specification HDD, the program returns to the step 1505 but when the MD inspected in the step 1509 is determined as an off-quality specification HDD, a special process is applied to the off-quality specification HDD in step 1510.

Figure 16:
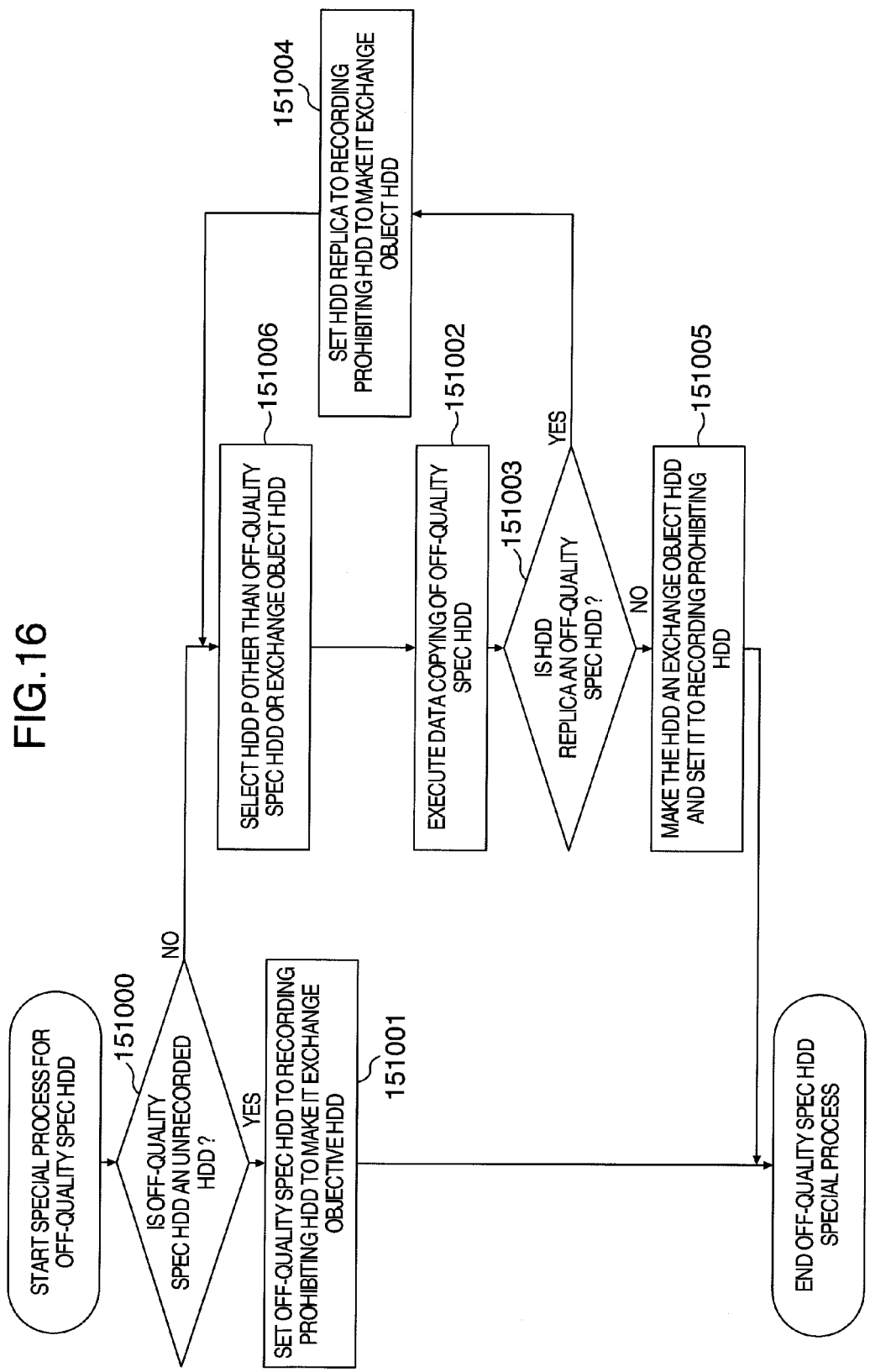
FIG. 16 is a flowchart of a special process for an off-quality specification recording medium in embodiment 2.

The special process applied to the off-quality specification HDD in the step 1510 will be detailed below by using FIG. 16.

Firstly, a decision is made in step 151000 as to whether the HDD is an unrecorded HDD and if the unrecorded HDD is present, a process in step 151001 is executed but if a recorded HDD is present, a process in step 151006 is executed.

In the step 151001, a process is carried out in which an off-quality specification HDD is set as a recording prohibiting HDD which in turn is prevented thereafter from being recorded and ejected from the archive device as an exchange objective HDD which in turn is exchanged with a new HDD. Also, in the information recording medium quality evaluation item values recorded in the information recording medium monitoring database 17 concerning the HDD set as the exchange objective disk, setting to the exchange objective HDD is added and the information recording medium quality evaluation item values of the off-quality specification HDD may be excluded when calculating the tendency to quality degradation 1110, inferable quality 1111 and quality sustaining time 1112 of all HDD's or may be used. Time to execute the process for exchanging the HDD set as the exchange objective HDD may be a time point at which the number of exchange objective HDD's amounts up to a constant value or the time to execute the exchanging process may be determined periodically, and the time to exchange is not limitative. Also, when the HDD set to the exchange objective HDD is not exchanged immediately, that HDD is caused to be temporarily in the custody of the archive device. For the newly added HDD, tendency to quality degradation 1110, inferable quality 1111 and quality sustaining time 1112 inclusive of the information recording medium quality evaluation item values of information recording medium preserved till then may be calculated or the values 1110 through 1112 may be calculated each time that HDD's are added at intervals of times for addition of the HDD's.

In step 151006, a HDD not determined as an off-quality specification HDD in the step 1505 or a HDD P not determined as a recording prohibiting HOD in the step 151004 is selected and a drive ID for the HDD P is supplied to the archive device controller 11.

In step 151002, all data to be recorded in the off-quality specification HDD are first reproduced and the reproduced data are sequentially transmitted to the archive device controller 11 via the wire centralizing unit 18. The archive device controller 11 sequentially supplies, as recording data, to the HDD P the received data and the received data are recorded sequentially in the HDD P, thus generating a replica of the off-quality specification HDD. In recording operation during the HDD replica preparation, a verify process of alternately repeating recording and reproduction as in the recording operation in the step 1502 shown in FIG. 15 is carried out to acquire information recording medium quality values during the recording operation.

In step 151003, by using the information recording medium quality evaluation item values acquired in the step 151002, a decision is made as to whether the HDD P replica is an off-quality specification HDD and if the HDD P replica is not an off-quality specification HDD, a process in step 151005 is executed but if the HDD P replica is an off-quality specification HDD, a process in step 151004 is carried out.

In the step 151005, a process similar to that in the step 151001 is carried out. In the step 151004, processes similar to those in the steps 151001 and 151005 are applied to the HDD replica and after completion of the processes, the process in the step 151006 is executed.

When the special process for the off-quality specification HDD ends, the program returns to the step 1505 in which a decision is made as to whether out of the off-quality specification HDD's, a HDD not applied with the process in the step 1508 is present and if the absence is determined, the evaluation ends but if the presence is determined, the process in the step 1508 is executed as described previously.

Figure 17:
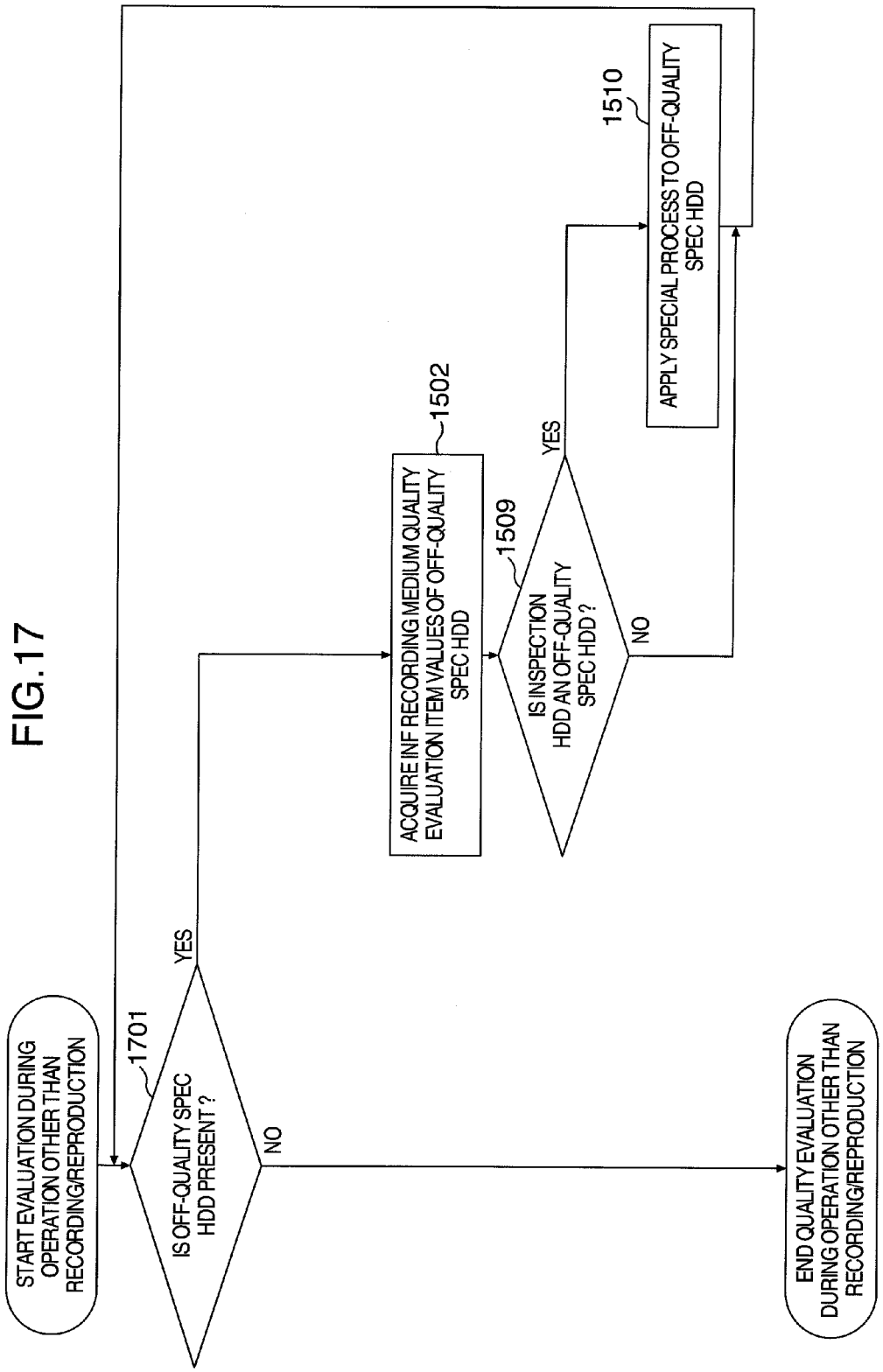
FIG. 17 is a flowchart of a process of evaluating the quality of information recording media during operation other than recording/reproduction in embodiment 2.

Illustrated in FIG. 17 is a flowchart of a process for evaluating information recording medium quality when the archive device 1200 operates in a mode other than recording/reproduction. In FIG. 17, processes identical to those in the flowchart of the information recording medium quality evaluation process executed during recording/reproduction operation shown in FIG. 15 are designated by identical reference signs to those in FIG. 15 and their operational description will be omitted.

In step 1701, the information recording medium quality monitor 16 compares quality sustaining time 1112 of all HDD's in FIG. 14 recorded in the information recording medium monitoring database 17 with time to preserve all of the HDD's 19 in the drive and when results of comparison shows that the quality sustaining time 1112 exceeds the HDD preservation time 1401, evaluation during in the operation mode other than the recording/reproduction ends but when the quality sustaining time is below the HDD preservation time, a process in step 1502 is executed.

Processes in steps 1502, 1509 and 1510 shown in FIG. 17 are similar to those in the steps 1502, 1509 and 1510 in FIG. 15 described previously.

Evaluations during operation other than recording/reproduction may always be executed while the archive is kept started, may be executed either periodically or upon receipt of commands from the host computer 20 shown in FIG. 12, or the information recording medium monitoring database is provided with the function to output an alarm signal when the quality sustaining time 1112 decreases to below the disk preservation time 1112, thereby ensuring that the processes shown in FIG. 17 can be executed, so that the time for evaluation during operation other than recording/reproduction is not limitative. Further, when the archive device does not perform recording/reproduction and information recording medium quality evaluation item values are not at all recorded in the information recording medium monitoring database, the information recording medium quality monitor 16 compares a predetermined initial quality sustaining time with the lapse time so as to carry out a process similar to that in the step 1701.

As will be seen from the above, in the archive device using the HDD in which the information recording medium is integral with the information recording/reproduction drive, the mechanism for conveying the information recording medium can be eliminated and, by acquiring information recording medium quality evaluation item values during ordinary recording/reproduction, calculating tendency to quality degradation of information recording medium from the acquired results and inferring the quality of information recording medium from the calculated tendency to quality degradation, the quality of information recording medium to be preserved in the archive device can be monitored while mitigating the process for monitoring the information recording medium quality, so that the reliability of data to be recorded in the archive drive can be improved.

Third Embodiment

Embodiment 3 will be described in which the present invention is applied to an archive apparatus constituted by connecting at least one archive device in embodiment 1 to at least one archive device in embodiment 2 mutually to construct an information recording/reproducing apparatus.

The construction and operation of the archive apparatus in embodiment 3 will be detailed with reference to the accompanying drawings.

Figure 18:
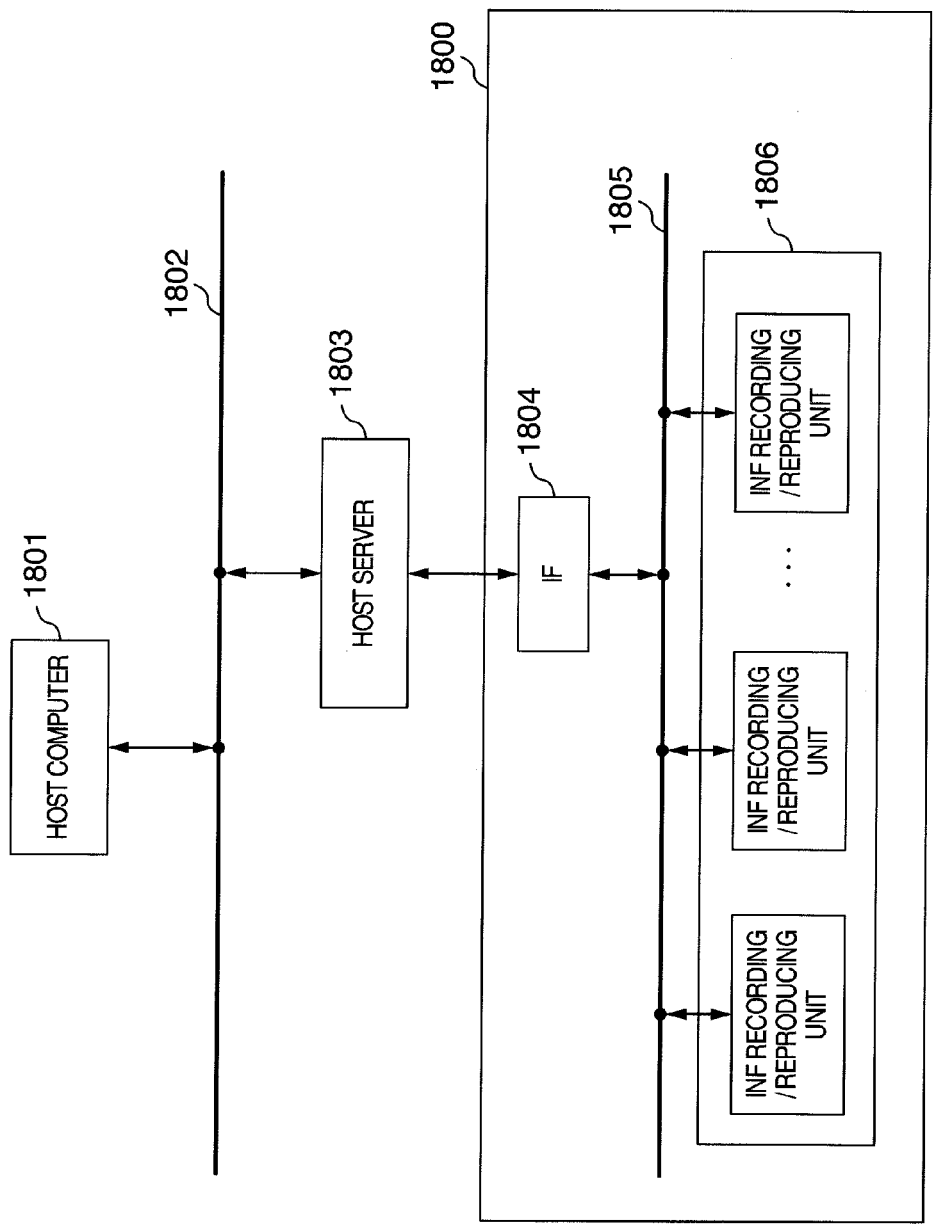
FIG. 18 is a block diagram of an archive apparatus constituted by a host server and information recording/reproduction devices in embodiment 3.

Only points differing from those in embodiments 1 and 2 will hereinafter be described and parts having the same function as those described so far will be designated by identical reference signs and will not be described. The archive apparatus in embodiment 3 is illustrated in block diagram form in FIG. 18.

A host server 1803 has the function to control the overall operation of an archive apparatus 1800 and in accordance with instructions and commands supplied from a host computer 1801 via a bus 1802, the host server 1803 records/reproduces data to/from a predetermined information recording/reproducing unit 1806 provided inside the archive apparatus 1800. While recording/reproducing, the information recording/reproducing unit 1806 supplies recorded/reproduced data and information recording medium quality evaluation item values acquired during recording/reproduction to the host server 1803 via an IF 1804. In the present embodiment, the information recording/reproducing unit used in the archive device described in connection with embodiment 1, the information recording/reproduction unit used in the archive device described in connection with embodiment 2 or both the information recording/reproduction units used in the archive devices described in connection with embodiments 1 and 2 may be used as the information recording/reproducing unit 1806.

Figure 19:
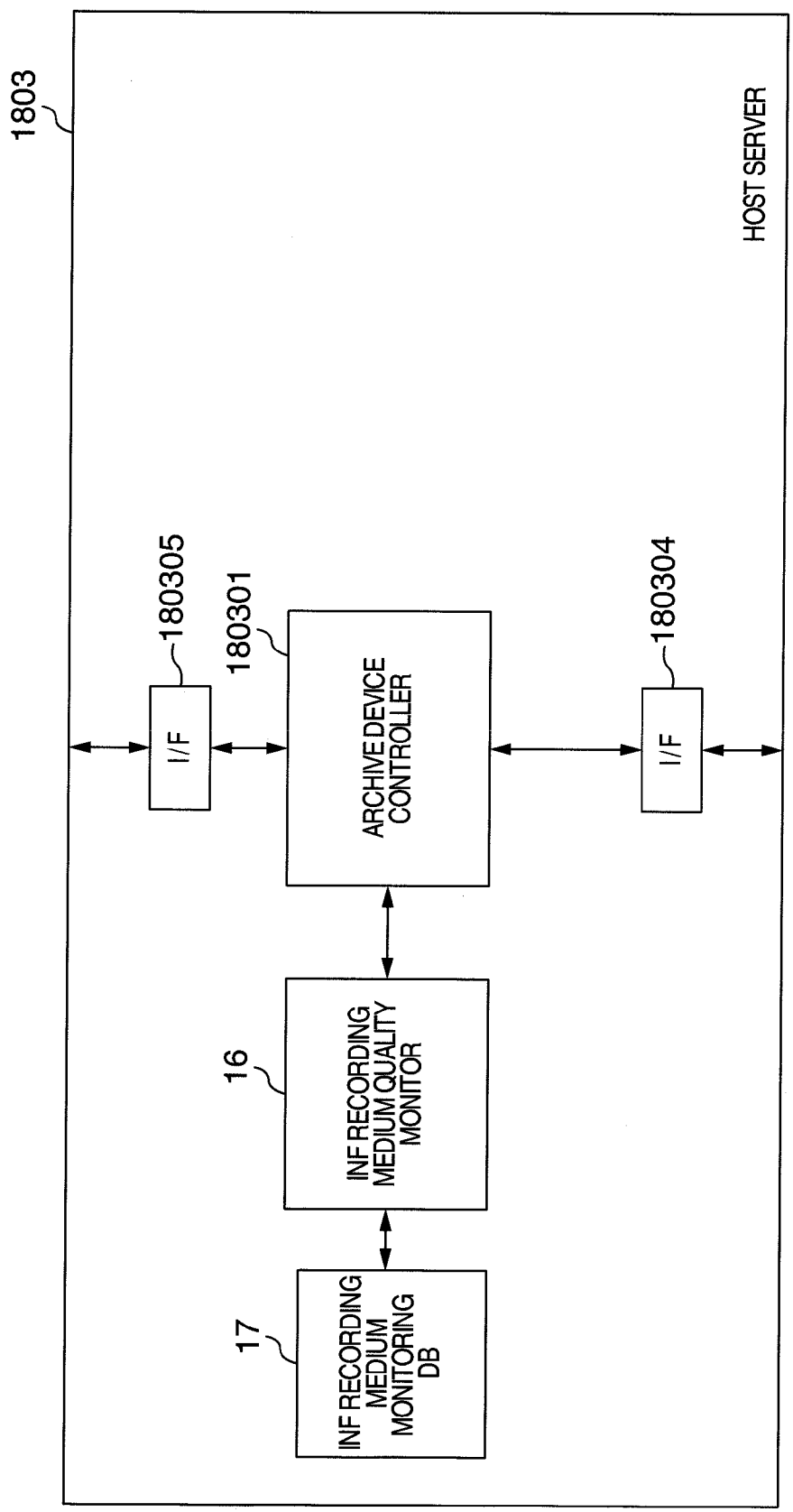
FIG. 19 is a block diagram of the host server in embodiment 3.

The host server 1803 is constructed as illustrated in FIG. 19.

The host server 1803 is constituted by an archive apparatus controller 180301, an information recording medium quality monitor 16, an information recording medium quality monitoring database 17, and interfaces 180304 and 180305.

In accordance with instructions and commands supplied from the host computer 1801 via the interface 180305, the archive apparatus controller 180301 supplies to the archive apparatus 1800 an archive apparatus control signal and recorded data via the interface 180304, supplies to the information recording medium quality monitor 16 the information recording medium quality evaluation item values supplied from the archive apparatus 1800 via the interface 180304 and supplies to the host computer 1801 reproduced data via the interface 180305.

Figure 20:
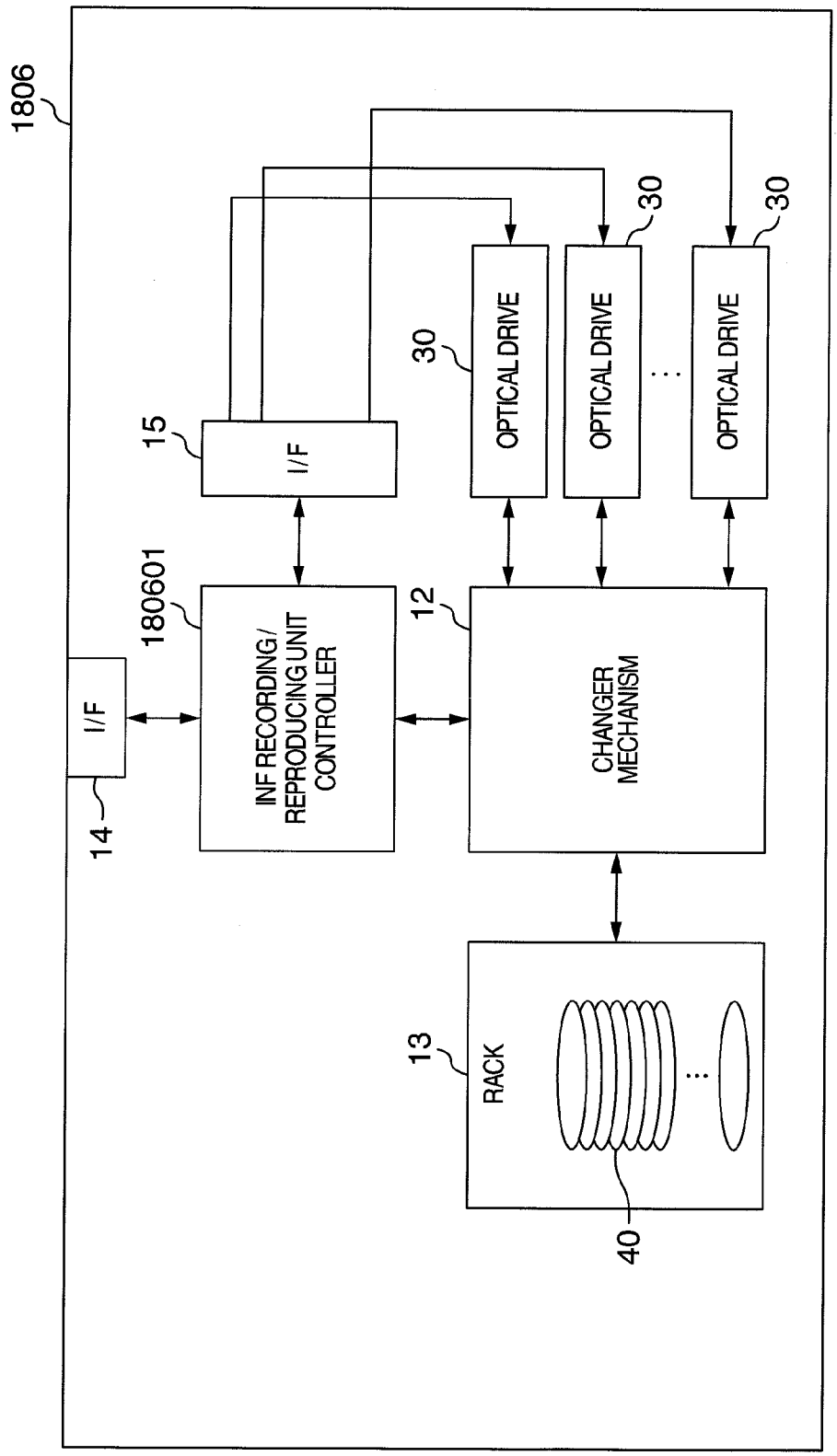
FIG. 20 is a block diagram of an information recording/reproduction unit in embodiment 3.

The information recording/reproducing unit 1806 in embodiment 3 is constructed as illustrated in block diagram form in FIG. 20. The information recording/reproducing unit in the present embodiment differs from the archive device described in connection with embodiment 1 in that the information recording medium quality monitor 16 and information recording monitor DB 17 are not provided and that an information recording/reproducing unit controller 180601 substitutes for the archive device controller 11.

The information recording/reproducing unit controller 180601 has the function to control the overall operation of the information recording/reproducing unit 1806 and operates the changer mechanism 12 to cause it to take out a predetermined optical disk 40 and convey and load the optical disk to a predetermined optical drive 30 and on it. Or, conversely, an optical disk 40 ejected from the predetermined optical drive 30 is conveyed and accommodated to and in a predetermined slot of rack 13. The respective optical drives 30 are connected mutually and to the information recording/reproducing unit controller 180601 through the drive interface 15 so that in accordance with an archive apparatus control signal supplied from the host server 1803 to the predetermined optical drive 30, the information recording/reproducing unit controller 180601 transmits various commands for recording and reproduction and data to be recorded and receives results of execution of the commands, reproduced data and information recording medium quality evaluation item values to be described later. Also, the information recording/reproducing unit controller 180601 supplies the thus received information recording medium quality evaluation item values to the host server 1803 via the interface 14.

Figure 21:
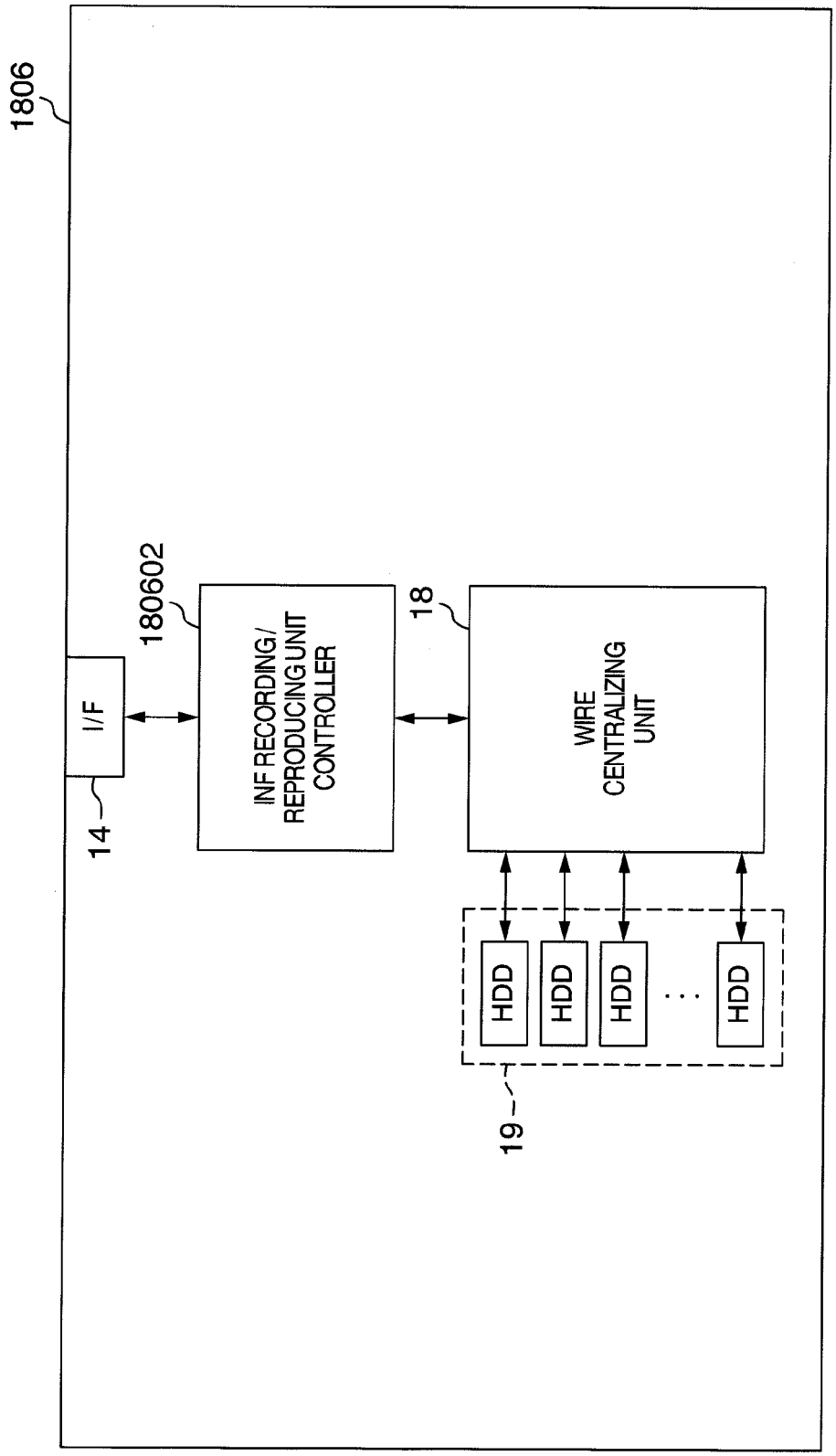
FIG. 21 is a block diagram similar to FIG. 20 in embodiment 3.

The information recording/reproducing unit 1806 in embodiment 3 is constructed as diagrammatically illustrated in FIG. 21. The information recording/reproducing unit in the present embodiment differs from the archive device in embodiment 2 in that the information recording medium quality monitor 16 and the information recording medium monitor DB 17 are not provided and that the information recording/reproducing unit controller 180602 substitutes for the archive apparatus controller 11.

The information recording/reproducing unit controller 180602 has the function to control the overall operation of the information recording/reproducing unit 1806 and in accordance with predetermined instructions and commands received from the host server 1803 via the wire centralizing unit 18, records/reproduces data to/from a predetermined HDD. During recording/reproduction, the HDD 19 supplies recorded/reproduced data and information recording medium quality evaluation item values obtained during recording/reproduction to the information recording/reproduction unit controller 180602 via the wire centralizing unit 18 and the information recording/reproducing unit controller 180602 supplies the information recording medium quality evaluation item values to the host server 1803 via the interface 14.

As described previously, the information recording/reproducing unit 1806 shown in FIG. 20 or that shown in FIG. 21 may be used as the information recording/reproducing unit 1806 in embodiment 3.

Figure 22:
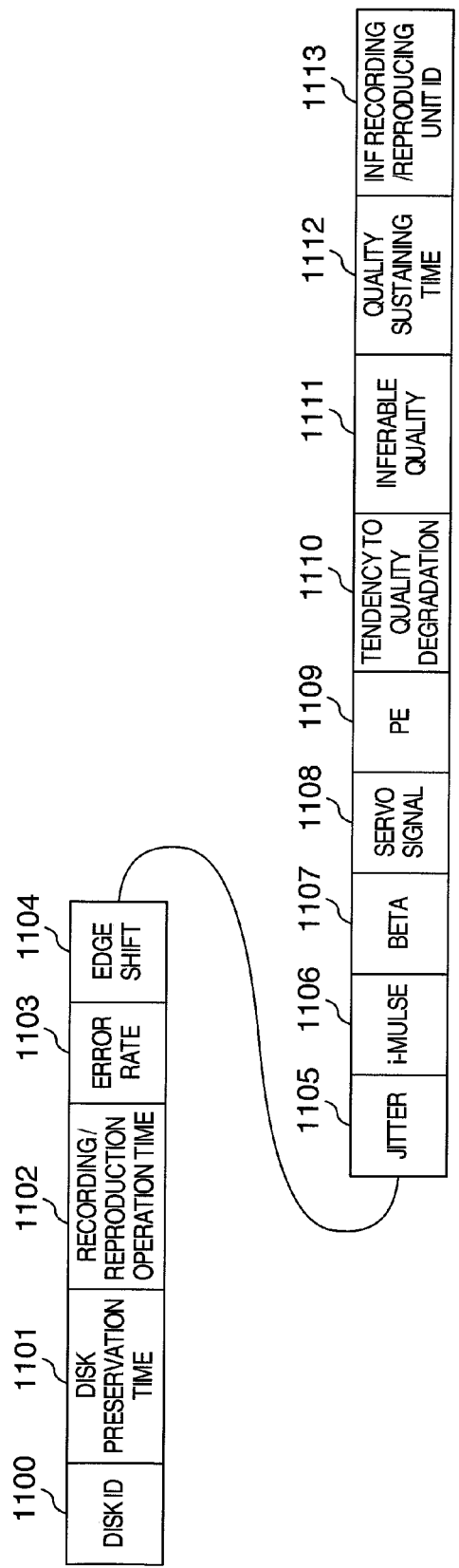
FIG. 22 is a diagram showing information recording medium quality evaluation items in embodiment 3.
Figure 23:
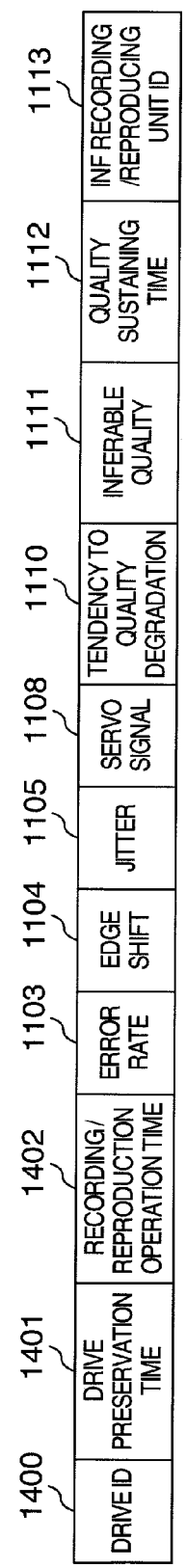
FIG. 23 is a diagram similar to FIG. 22 in embodiment 3.

Turning now to FIGS. 22 and 23, the information recording medium quality evaluation item values described so far will be explained.

The information recording medium quality evaluation item values as shown in FIG. 22 differ from those in embodiment 1 in that ID 1113 of information recording/reproducing unit inherent to each of the plurality of information recording/reproducing units 1806 is added.

By registering the information recording/reproducing unit ID 1113 in the information recording medium monitoring DB, the archive apparatus controller 180301 can manage information recording media provided for the archive apparatus in respect of each of the information recording/reproducing units having the information recording medium, making it possible to monitor qualities of all of the information recording media provided for the archive apparatus.

The information recording medium quality evaluation item values as shown in FIG. 23 differ from those in embodiment 2 in that as in the information recording medium quality evaluation items shown in FIG. 22, ID 1113 of information recording/reproducing unit inherent to each of the plurality of information recording/reproducing units 1806 is added.

A process for evaluating qualities of information recording media executed during recording/reproduction operation follows FIG. 1 when the archive apparatus using the information recording/reproducing unit 1806 as shown in FIG. 20 is used but follows FIG. 15 when the archive apparatus using the information recording/reproducing unit 1806 as shown in FIG. 21 is used. Further, a process for evaluating quality of information recording media during operation other than recording/reproduction follows FIG. 10 when the archive apparatus uses the information recording/reproduction unit 1806 as shown in FIG. 20 and follows FIG. 17 when the archive apparatus uses the information recording/reproduction unit 1806 as shown in FIG. 21.

When calculating the tendency to quality degradation 1110, inferable quality 1111 and quality sustaining time 1112 of information recording medium in embodiment 3, the calculation may be executed in respect of each of the information recording/reproducing unit ID's 1113 or may be calculated irrespective of the information recording/reproducing unit ID 1113 by using all information recording media provided for the archive apparatus and so, the calculation method is not limitative.

As described above, in the archive apparatus in which at least one of the archive devices described in connection with embodiment 1 and at least one of the archive devices described in connection with embodiment 2 are mutually connected, by causing the host server for controlling the archive apparatus to monitor the quality of information recording medium, the archive apparatus can be allowed for having no monitor and database for the information recording medium and all information recording media provided for the archive apparatus can be managed centrally.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information recording/reproducing device capable of recording or reproducing information to or from a plurality of information recording media, comprising:
    a plurality of information recording/reproduction drives which can record or reproduce said information recording media and during recording or reproduction, can measure information recording medium quality evaluation item values representing values indicative of qualities of the information recording media; and
    an information recording medium monitor which can calculate tendency to quality degradation of the information recording medium from information recording medium quality evaluation item values preserved by an information recording medium monitoring database which can preserve the measured information recording medium quality evaluation item values, said information recording medium monitor being capable of calculating from a tendency to quality degradation of an arbitrary information recording medium the quality of another information recording medium.

2. The information recording/reproducing device according to claim 1,
    wherein said information recording medium monitor compares the calculated quality of information recording medium with a quality specification value said information recording medium monitor defines in advance and sets an information recording medium not satisfying the quality specification value to an off-quality specification medium and applies to it a predetermined process.

3. The information recording/reproducing device according to claim 2,
    wherein in said predetermined process, information recording medium quality evaluation item values are acquired by reproducing said off-quality specification medium and recording is not applied to an information recording medium which does not satisfy the quality specification value when comparison with the quality specification value is again executed by using the acquired results.

4. The information recording/reproducing device according to claim 2,
wherein in said predetermined process, information recording medium quality evaluation item values are acquired by reproducing said off-quality specification medium and a replica of an off-quality specification is prepared for an information recording medium which does not satisfy the quality specification value when comparison with the quality specification value is again executed by using the acquired results and then, said information recording medium is exchanged with a new information recording medium.

5. The information recording/reproducing device according to claim 1,
wherein items of said information recording medium quality evaluation item values are at least one or more of a tendency to quality degradation, an error rate, a jitter and edge shift, an i-MLSE, a beta, a servo signal and a pull-in error signal.

6. The information recording/reproducing device according to claim 1,
wherein the tendency to quality degradation and another information recording medium quality are calculated on the assumption that the information recording medium quality evaluation item values change linearly in relation to the time axis.

7. The information recording/reproducing device according to claim 1,
wherein predetermined values are saved as initial values of the information recording medium quality evaluation item values in said information recording medium monitoring database and the tendency to quality degradation and another information recording medium quality are calculated by using the initial values.

8. The information recording/reproducing device according to claim 1,
wherein said tendency to quality degradation is saved in advance in said information recording medium monitoring database and by using the tendency to quality degradation saved in advance, another information recording medium quality is calculated.

9. The information recording/reproducing device according to claim 7,
wherein when calculating the quality of an information recording medium having the information recording medium quality evaluation item values saved in said information recording medium monitoring database, said initial value is not used.

10. The information recording/reproducing device according to claim 8,
wherein when calculating the tendency to quality degradation of the information recording medium having its information recording medium quality evaluation item values saved in said information recording medium monitoring database, said tendency to quality degradation saved in advance is not used.

11. The information recording/reproducing device according to claim 1,
wherein said information recording medium is provided inside said information recording drive.

12. The information recording/reproducing device according to claim 1,
wherein said information recording medium monitoring database is provided inside said information recording/reproducing device.

13. An information recording/reproducing method comprising the steps of:
measuring information recording medium quality evaluation item values representing values indicative of the quality of an information recording medium during recording/reproduction of an arbitrary information recording medium out of a plurality of information recording media;
calculating a tendency to quality degradation of the recorded/reproduced information recording medium from results of the measurement; and
calculating the quality of another information recording medium from the calculated tendency to degradation tendency of information recording medium.

14. An information recording/reproducing method comprising the steps of:
measuring information recording medium quality evaluation item values representing values indicative of the quality of an information recording medium during recording/reproduction of an arbitrary information recording medium out of a plurality of information recording media; and
comparing, on the basis of the measurement results and from the tendency to degradation of the recorded/reproduced information recording medium, the quality of another recording medium with a predetermined quality specification value and discarding an information recording medium not satisfying the quality specification value in the comparison result.

15. A server being connectable to one or more information recording/reproducing unit capable of recording or reproducing information to or from a plurality of information recording media, said information recording/reproducing unit having a plurality of information recording/reproduction drives capable of recording or reproducing the information recording medium and capable of measuring information recording medium quality evaluation item values representing the quality of information recording medium during recording or reproduction, comprising:
an interface for connecting to said information recording/reproducing unit; and
an information recording medium monitor which can calculate the tendency to quality degradation of the information recording medium from information recording medium quality evaluation item values an information recording medium monitoring database capable of holding the measured information recording medium quality evaluation item values has,
whereby said information recording medium monitor can calculate the quality of another information recording medium from the tendency to quality degradation of an arbitrary information recording medium.

16. The server according to claim 15, wherein said information recording medium monitor compares said calculated information recording medium quality with a quality specification value said information recording medium monitor determines in advance and gives to said information recording/reproducing unit a predetermined instruction for applying a predetermined treatment to the information recording medium not satisfying the quality specification value to deal with it as an off-quality specification medium.

17. The server according to claim 16, wherein in said predetermined treatment, said off-quality specification medium is reproduced to obtain information recording medium quality evaluation item values, comparison with said quality specification value is executed again by using acquired results and recording is not applied to an information recording medium not satisfying the quality standard values.

18. The server according to claim 16, wherein in said predetermined treatment, information recording medium quality evaluation item values are acquired by reproducing said off-quality specification medium, the acquired results are again compared with the quality specification value and for an information recording medium not satisfying the quality specification value, a replica of off-quality specification medium is prepared and then exchange with a new information recording medium is carried out.

19. The server according to claim 15, wherein said information recording medium quality evaluation item values are at least one or more of an error rate, a jitter and edge shift, an i-MLSE, a beta, a servo signal and a pull-in error signal.

20. The server according to claim 15, wherein said information recording medium monitoring database is provided inside said server.

* * * * *